(12) United States Patent
Matsuoka

(10) Patent No.: US 7,059,277 B2
(45) Date of Patent: Jun. 13, 2006

(54) GAS ENGINE

(75) Inventor: Toshio Matsuoka, Osaka (JP)

(73) Assignee: Yanmar Co., Ltd. (JP)

( * ) Notice: Subject to any disclaimer, the term of this patent is extended or adjusted under 35 U.S.C. 154(b) by 16 days.

(21) Appl. No.: 10/470,759

(22) PCT Filed: Jan. 31, 2002

(86) PCT No.: PCT/JP02/00813

§ 371 (c)(1),
(2), (4) Date: Jul. 31, 2003

(87) PCT Pub. No.: WO02/061256

PCT Pub. Date: Aug. 8, 2002

(65) Prior Publication Data

US 2004/0068987 A1 Apr. 15, 2004

(30) Foreign Application Priority Data

Feb. 1, 2001 (JP) ............................. 2001-025337

(51) Int. Cl.
*F02M 27/02* (2006.01)
(52) U.S. Cl. .......................................................... 123/3
(58) Field of Classification Search ................ 123/200, 123/3, 1 A, DIG. 12, 538, 557, 527, 525; 60/39.5, 39.182, 39.465, 39.12
See application file for complete search history.

(56) References Cited

U.S. PATENT DOCUMENTS 4,011,840 A * 3/1977 Forster ........................... 123/3
5,299,536 A * 4/1994 Moard et al. ................... 123/3
5,425,332 A * 6/1995 Rabinovich et al. ............ 123/3
5,785,136 A * 7/1998 Falkenmayer et al. ..... 180/65.2
6,210,822 B1 * 4/2001 Abersfelder et al. .......... 429/19
6,508,209 B1 * 1/2003 Collier, Jr. ...................... 123/3

FOREIGN PATENT DOCUMENTS

| DE | 4315034 A1 | 11/1993 |
|---|---|---|
| EP | 1 057 998 A1 | 12/2000 |
| JP | 58-172048 A1 | 11/1983 |

(Continued)

OTHER PUBLICATIONS

International Search Report for PCT/JP02/00813 mailed on May 21, 2002.

(Continued)

*Primary Examiner*—Henry C. Yuen
*Assistant Examiner*—Hyder Ali
(74) *Attorney, Agent, or Firm*—Rader, Fishman & Grauer PLLC

(57) ABSTRACT

A transformer (57) using exhaust gas heat as a heat source is provided at a fuel supply system (5) of a gas engine (1), wherein the transformer (57) causes a transformational reaction ($H_2+CO_2 \rightarrow CO+H_2O$) between hydrogen and carbon dioxide, thus changing the composition of the fuel, and this fuel with a changed composition is supplied to a combustion chamber. Furthermore, water vapor is produced by an exhaust heat boiler (52) using exhaust gas heat as a heat source, and this water vapor is supplied to a fuel supply system. Further still, a hydrogen separating device (56) is provided that separates and extracts hydrogen from a fuel, and the fuel is supplied to a combustion chamber after hydrogen is separated and extracted.

29 Claims, 13 Drawing Sheets

FOREIGN PATENT DOCUMENTS

| | | | |
|---|---|---|---|
| JP | 62-279263 | A1 | 12/1987 |
| JP | 63285254 | A * | 11/1988 |
| JP | 03-000961 | A1 | 1/1991 |
| JP | 03194111 | A * | 8/1991 |
| JP | 05-184865 | A1 | 7/1993 |
| JP | 08-049604 | A1 | 2/1996 |
| JP | 11-336562 | A1 | 12/1999 |
| JP | 2000-291499 | | 10/2000 |
| WO | WO 95/27845 | | 10/1995 |

OTHER PUBLICATIONS

International Preliminary Examination Report for PCT/JP02/00813 completed on Mar. 18, 2003.

Korean Office Action, document No.: 137-810, dated Sep. 16, 2005.

Supplementary European Search Report, Application No. EP 02 71 0446, Nov. 3, 2005.

* cited by examiner

GAS ENGINE

TECHNICAL FIELD

The present invention concerns gas engines that use fuels, such as 6C and 6B gases, containing a comparatively large proportion of hydrogen components, and gas engines that use pure hydrogen as a fuel. In particular, the present invention relates to measures for improving the practicability of these types of gas engines.

BACKGROUND ART

Conventionally known as one type of gas engine are gas engines that use gases such as 6C gas and 6B gas, which contain a comparatively large proportion of hydrogen components, and that use pure hydrogen as a fuel.

FIG. 13 is a block diagram that shows an overall configuration of a power generating system that generates power with this type of gas engine. As the diagram shows, in this gas engine, an output shaft 131a that extends from an engine unit 131 is connected to a power generating device 132, and power is generated by the power generating device 132 using the rotational driving force of the output shaft 131a.

Furthermore, the air intake system of the gas engine contains an air supply system and a fuel supply system. A gaseous mixture of air supplied from the air supply system and fuel supplied from the fuel supply system is supplied to the combustion chamber so that the engine unit 131 is able to drive.

The air supply system is provided with a supercharger (compressor) 133 and an intercooler 134. Air is compressed by the supercharger 133, then this air is cooled by the intercooler 134, enabling high density air to be supplied to the combustion chamber. It should be noted that the supercharger c is directly coupled to an output shaft 136a of a turbine 136 provided at an exhaust tube 135 through which exhaust gas passes, and compresses air with the rotational output of the turbine 136.

This gaseous mixture of air supplied from the air supply system and fuel (hydrocarbon-based fuels, pure hydrogen, etc.) supplied from the fuel supply system is supplied to the combustion chamber, and power is generated by the power generating device 132 driven by the engine unit 131.

However, this type of gas engine has the following problems, and sufficient practicability is yet to be achieved.
(1) Backfiring occurs easily because the combustion velocity inside the combustion chamber is high.
(2) Knocking occurs easily because the methane number of the fuel is low.
(3) The high rate of heat generation invites reduced thermal efficiency of the engine.

The inventors of the present invention studied the causes of these drawbacks, and they found the presence of hydrogen components in fuels to be a cause of these drawbacks.

In consideration of these points, the object of the present invention is to present a gas engine that can prevent backfiring and knocking, and can improve engine thermal efficiency.

DISCLOSURE OF INVENTION

In order to achieve the above-mentioned object, the present invention lowers the combustion velocity, raises the methane number, and, further still, keeps down the rate of heat generation by such operations as reducing the amount of hydrogen components in a supplied fuel by changing the composition of the fuel with a transformational reaction between hydrogen and carbon dioxide, or by separating hydrogen from the fuel, and as increasing the heat capacity of the fuel by supplying water vapor to the fuel supply system.

The gas engine corresponding to claim 1 of the present invention (hereafter "invention 1") assumes a gas engine that uses a fuel containing hydrogen components. This gas engine is provided with a transformer that uses engine exhaust heat as a heat source, wherein a transformational reaction ($H_2+CO_2 \rightarrow CO+H_2O$) between hydrogen and carbon dioxide is caused to occur in the transformer, changing a composition of the fuel, and the fuel with a changed composition is supplied to a combustion chamber.

The gas engine corresponding to claim 2 of the present invention (hereafter "invention 2") is a gas engine that uses a fuel containing-hydrogen components, and is provided with a water vapor producing means for producing water vapor using engine exhaust heat as a heat source, wherein water vapor produced by the water vapor producing means is supplied to a fuel supply system.

The gas engine corresponding to claim 3 of the present invention (hereafter "invention 3") is a gas engine that uses a fuel containing hydrogen components, and is provided with a hydrogen separating means for separating and extracting hydrogen from the fuel, wherein a fuel from which hydrogen has been separated and extracted by the hydrogen separating means is supplied to a combustion chamber.

The gas engine corresponding to claim 4 of the present invention (hereafter "invention 4") is a gas engine provided with at least two of the configurations of inventions 1 to 3. That is, at least two of the following operations are performed: a supply operation in which a fuel that has a changed composition due to a transformational reaction using the transformer of the gas engine according to invention 1 is supplied to a combustion chamber, a supply operation in which water vapor that is produced by the water vapor producing means in the gas engine according to invention 2 is supplied to a fuel supply system, and a supply operation in which a fuel from which hydrogen has been separated and extracted by the hydrogen separating means in the gas engine according to invention 3 is supplied to a combustion chamber.

In the above configurations, in invention 1, the amount of hydrogen components in the fuel is reduced by a transformational reaction inside the transformer, in invention 2, the heat capacity of the fuel is increased by the admixture of water vapor, and in invention 3, the hydrogen concentration in the supplied fuel is reduced. The results of this are that the combustion velocity in the combustion chamber is lowered, thus enabling the occurrence of backfiring to be inhibited, and the methane number of the fuel is raised, thus enabling the occurrence of knocking to be suppressed (the methane number of $H_2$ is 0, and the methane number of CO is 73). Further still, the rate of heat generation is reduced, thus improving engine thermal efficiency. It should be noted that the influence and effect of these can be obtained outstandingly in invention 4, which is configured as a combination of the configurations in inventions 1 to 3.

The gas engine corresponding to claim 5 of the present invention (hereafter "invention 5") is an explicit configuration for supplying carbon dioxide to the transformer. In short, a configuration according to invention 1 or 4, wherein the engine exhaust system is provided with a $CO_2$ separating means, and wherein the carbon dioxide separated from the exhaust gas by the $CO_2$ separating means is supplied to the transformer.

The gas engine corresponding to claim 6 of the present invention (hereafter "invention 6") is specifically configured for supplying carbon dioxide to the transformer. In short, a configuration according to invention 1 or 4, provided with a hydrogen separating means for separating and extracting hydrogen from a fuel, wherein the hydrogen separated by the hydrogen separating means is supplied to the transformer.

The gas engine corresponding to claim 7 of the present invention (hereafter "invention 7") is a gas engine in which the configurations of inventions 5 and 6 are used together. That is, the following operations are performed together: a supply operation in which carbon dioxide separated by the $CO_2$ separating means of the gas engine according to invention 5 is supplied to the transformer, and a supply operation in which hydrogen separated by a hydrogen separating means of the gas engine according to invention 6 is supplied to the transformer.

With inventions 5 and 7, exhaust gas is used effectively so that a transformational reaction can be caused in the transformer, thus there is no need to provide a special supply source of carbon dioxide. Furthermore, with inventions 6 and 7, hydrogen separated and extracted from the fuel is used effectively so that a transformational reaction can be caused in the transformer, thus there is no need to provide a special supply source of hydrogen.

The gas engines corresponding to claims 8 to 10 of the present invention (hereafter "inventions 8 to 10") are provided with an additional means for reforming hydrocarbon-based fuels as a fuel. That is, invention 8 is a configuration according to any of the configurations of inventions 1, or 4 to 7, wherein the fuel is a hydrocarbon-based fuel, wherein the gas engine is provided with a fuel reforming device that reforms fuel by using engine exhaust heat to cause an endothermic reaction ($CmHn+mH_2O \rightarrow mCO+(n/2+m)H_2$) between water vapor and the fuel, and wherein a fuel reformed by the fuel reforming device is supplied to a combustion chamber.

Furthermore, the gas engine corresponding to claim 9 of the present invention (hereafter, "invention 9") is a gas engine according to the configuration of invention 2, wherein the fuel is a hydrocarbon-based fuel, wherein the gas engine comprises a fuel reforming device that reforms fuel by using engine exhaust heat to cause an endothermic reaction ($CmHn+mH_2O \rightarrow mCO+(n/2+m)H_2$) between water vapor and the fuel, and wherein a fuel reformed by the fuel reforming device is supplied to a combustion chamber.

And further still, the gas engine corresponding to claim 10 of the present invention (hereafter, "invention 10"), is a gas engine according to the configuration of invention 3, wherein the fuel is a hydrocarbon-based fuel, wherein the gas engine comprises a fuel reforming device that reforms fuel by using engine exhaust heat to cause an endothermic reaction ($CmHn+mH_2O \rightarrow mCO+(n/2+m)H_2$) between water vapor and the fuel, and wherein a fuel reformed by this fuel reforming device is supplied to a combustion chamber.

With the configurations of inventions 8 to 10, it is possible to achieve improvements in engine thermal efficiency by reforming the hydrocarbon-based fuel. Furthermore, as it is possible to use fuels other than hydrocarbon-based fuels, it is possible to facilitate fuel diversification. In other words, it is possible to freely select hydrocarbon fuels and fuels other than hydrocarbon fuels for a gas engine of the same configuration.

The gas engines corresponding to claims 11 and 12 of the present invention (hereafter "invention 11" and "invention 12" respectively) relate to improvement for configurations provided with the fuel reforming device described above. That is, the configuration of invention 11 is a gas engine according to the configuration of invention 10, wherein the hydrogen separating device and the fuel reforming device are integrally configured, wherein, while hydrogen is separated and extracted by the hydrogen separating means, a fuel reforming operation is performed by the fuel reforming device. Furthermore, the configuration of invention 12 is a gas engine according to the configuration of invention 8, wherein the hydrogen separating means for separating and extracting hydrogen from the fuel, and the fuel reforming device are integrally configured, wherein while hydrogen is separated and extracted by the hydrogen separating means, a fuel reforming operation is performed by the fuel reforming device. With these configurations, the fuel reforming device and the hydrogen separating means do not need to be connected by piping, thus enabling compactness for the engine as a whole.

The gas engines corresponding to claims 13 to 20 of the present invention (hereafter "inventions 13 to 20") relate to configurations for achieving promotion of the transformational reaction or the endothermic reaction (reforming reaction). That is, invention 13 is a configuration according to any of the configurations of inventions 1, 4 to 7, 8 or 12, wherein the temperature inside the transformer is raised by combusting a portion of pre-transformation fuel or post-transformation fuel.

Invention 14 is a configuration according to the configuration of invention 8 or 12, wherein the temperature inside the transformer is raised by combusting a portion of pre-reforming fuel or post-reforming fuel.

The gas engine corresponding to claim 15 of the present invention (hereafter, "invention 15"), is a gas engine according to any of the configurations of inventions 8 to 12, wherein the temperature inside the fuel reforming device is raised by combusting a portion of pre-reforming fuel or post-reforming fuel.

The gas engine corresponding to claim 16 of the present invention (hereafter, "invention 16"), is a gas engine according to the configurations of either invention 8 or 12, wherein the temperature inside the fuel reforming device is raised by combusting a portion of pre-transformation fuel or post-transformation fuel.

The gas engine corresponding to claim 17 of the present invention (hereafter, "invention 17"), is a gas engine according to any of the configurations of inventions 1, 4 to 8, 12 to 14, or 16, provided with an oxidation catalyst device that causes non-combusted components in exhaust gas to be combusted, wherein the temperature inside the transformer is raised above the temperature of the exhaust by the combustion of non-combusted components with the oxidation catalyst device.

The gas engine corresponding to claim 18 of the present invention (hereafter, "invention 18"), is a gas engine according to any of the configurations of inventions 8 to 12, or 14 to 16, provided with an oxidation catalyst device that causes non-combusted components in exhaust gas to be combusted, wherein the temperature inside the fuel reforming device is raised above the temperature of the exhaust by the combustion of non-combusted components with the oxidation catalyst device.

The gas engine corresponding to claim 19 of the present invention (hereafter, "invention 19"), is a gas engine according to any of the configurations of inventions 1, 4 to 7, 8, 12 to 14, or 16, provided with a hydrogen absorbing device that contains a hydrogen absorbing material and is capable of absorbing hydrogen, wherein the temperature inside the transformer is raised above the temperature of the exhaust by the heat generated by hydride formation when the hydrogen absorbing material absorbs hydrogen.

The gas engine corresponding to claim 20 of the present invention (hereafter, "invention 20"), is a gas engine according to any of the configurations of inventions 8 to 12, or 14 to 16, provided with a hydrogen absorbing device that contains a hydrogen absorbing material and is capable of absorbing hydrogen, wherein the temperature inside the fuel reforming device is raised above the temperature of the exhaust by the heat generated by hydride formation when the hydrogen absorbing material absorbs hydrogen.

With these specified items, the transformational reaction and the reforming reaction can be caused to occur in a high-temperature environment, thus effectively achieving promotion of the reactions. For example, a transformational reaction or a reforming reaction generally requires a temperature above 700° C. When using exhaust gas as the heat source for the reactions, each reaction can be caused to occur in a high-temperature environment, even when the temperature of the exhaust gas is less than 700° C., thus making it possible to achieve a high conversion rate.

The gas engine corresponding to claim 21 of the present invention (hereafter, "invention 21"), is a gas engine according to any of the configurations of inventions 8 to 12, 14 to 16, 18, or 20, wherein the pressure inside the fuel reforming device can be reduced when a hydrocarbon-based fuel is reformed. When the internal pressure of the fuel reforming device is set low, a sufficient reforming reaction can be carried out even with a comparatively low temperature (exhaust temperature) of the heat source that heats the fuel reforming device, and a high conversion rate can be obtained.

The gas engine corresponding to claim 22 of the present invention (hereafter, "invention 22"), is a gas engine in which configurations of inventions 13 to 21 are used together. That is, at least two of the following operations are performed: a temperature-raising operation in which the temperature inside the transformer is raised by combusting a portion of pre-transformation fuel or post-transformation fuel in the gas engine according to invention 13, a temperature-raising operation in which the temperature inside the transformer is raised by combusting a portion of pre-reforming fuel or post-reforming fuel in the gas engine according to invention 14, a temperature-raising operation in which the temperature inside the fuel reforming device is raised by combusting a portion of pre-reforming fuel or post-reforming fuel in the gas engine according to invention 15, a temperature-raising operation in which the temperature inside the fuel reforming device is raised by combusting a portion of pre-transformation fuel or post-transformation fuel in the gas engine according to invention 16, a temperature-raising operation in which the temperature inside the transformer is raised by the combustion of non-combusted components by the oxidation catalyst device in the gas engine according to invention 17, a temperature-raising operation in which the temperature inside the fuel reforming device is raised by the combustion of non-combusted components by the oxidation catalyst device in the gas engine according to invention 18, a temperature-raising operation in which the temperature inside the transformer is raised by the heat generated by hydride formation when the hydrogen absorbing material absorbs hydrogen in the gas engine according to invention 19, a temperature-raising operation in which the temperature inside the fuel reforming device is raised by the heat generated by hydride formation when the hydrogen absorbing material absorbs hydrogen in the gas engine according to invention 20, or a pressure-reducing operation in which the pressure inside the fuel reforming device is reduced in the gas engine according to invention 21. In this way, when employing any of the configurations of inventions 13 to 20, the transformational reaction or the reforming reaction can be caused to occur in a high-temperature environment, thus effectively achieving promotion of the reactions. Furthermore, if these inventions are used together, it becomes possible to cause the reactions to occur with a high conversion rate even when, for example, the temperature of the exhaust is less than 600° C. Also, a high conversion rate can also be obtained when employing the configuration of invention 21.

The gas engine corresponding to claim 23 of the present invention (hereafter, "invention 23"), is a gas engine according to any of the configurations of inventions 19, 20, or 22, provided with a tank that stores hydrogen, wherein the hydrogen inside the tank is absorbed by the hydrogen absorbing material inside the hydrogen absorbing device, and hydrogen is drawn from the hydrogen absorbing device using engine exhaust heat and supplied to a combustion chamber. With this configuration, hydrogen can be stored stably in the hydrogen absorbing device and hydrogen can be supplied stably from this hydrogen absorbing device to a combustion chamber.

The gas engine corresponding to claim 24 of the present invention (hereafter, "invention 24"), is a gas engine according to any of the configurations of inventions 19, 20, or 22, provided with a tank that stores hydrogen, wherein the hydrogen inside the tank is absorbed by the hydrogen absorbing material inside the hydrogen absorbing device on the one hand, an exhaust temperature sensor that detects the temperature of the exhaust, and a pressure adjustment means for adjusting the pressure inside the hydrogen absorbing device. And, wherein, based on the exhaust temperature detected by the exhaust temperature sensor, the pressure adjustment means adjusts the pressure inside the hydrogen absorbing device, and controls the formation of hydrides of hydrogen and the hydrogen absorbing material, and the separation of hydrogen from the hydrogen absorbing material. With this configuration, it becomes possible to freely control the absorption and desorption of hydrogen of the hydrogen absorbing materials while effectively using the exhaust heat.

The gas engine corresponding to claim 25 of the present invention (hereafter "invention 25") is a gas engine in which the configurations of inventions 23 and 24 are used together. That is, the following operations are performed together: a supply operation in which hydrogen drawn from the hydrogen absorbing device is supplied to a combustion chamber in the gas engine according to invention 23, and a control operation in which the formation of hydrides of hydrogen and the hydrogen absorbing material, and the separation of hydrogen from the hydrogen absorbing material is controlled by adjusting the pressure inside the hydrogen absorbing device in the gas engine according to invention 24.

As for the gas engines corresponding to claims 26 and 27 of the present invention (hereafter "invention 26" and "invention 27" respectively), the configurations of invention 26 and invention 27 relate to improvements in the transformer and the fuel reforming device in consideration of starting ability and load responsiveness. That is, the configuration of invention 26 is a gas engine according to any of the inventions 1, 4 to 8, 12 to 14, 16, 17, 19, or 22, provided with a mixer that mixes hydrogen and post-transformation fuel, and an adjustment means capable of freely adjusting the mixing proportions in the mixer of hydrogen and post-transformation fuel.

Furthermore, the configuration of invention 27 is a gas engine according to any of the inventions 8 to 12, 14 to 16, 18, or 20 to 22, provided with a mixer that mixes hydrogen and hydrogen-separated reformed fuel, and an adjustment means capable of freely adjusting the mixing proportions in the mixer of hydrogen and hydrogen-separated reformed fuel.

With these specified items, the startup time required until the transformer and the fuel reforming device start operation can be shortened, thus improving responsiveness at the times of load input and load cutoff.

The gas engine corresponding to claim 28 of the present invention (hereafter "invention 28") is configured to achieve an enlarged scope of usage for the hydrogen separated and extracted by the hydrogen separating means. That is, the configuration of invention 28 is a gas engine according to any of the inventions 10 to 12, provided with a desulfurizing device that removes sulfur content contained in a fuel by hydrogenation-desulfurization, wherein a portion of the hydrogen separated and extracted by the hydrogen separating means is supplied to the desulfurizing device.

With this specified item, the hydrogen separated and extracted by the hydrogen separating means can also be used for the hydrogenation-desulfurization of the desulfurizing device. Conventionally, a hydrogen tank was provided in order to supply the hydrogen used for the hydrogenation-desulfurization, and it was necessary to replace or refill with hydrogen the hydrogen tank when it tank became empty. With this configuration, this hydrogen tank is not required, so there is no need for the tasks of replacement or hydrogen refilling.

The gas engine corresponding to claim 29 of the present invention (hereafter "invention 29") is a gas engine in which the operation of supplying hydrogen is explicitly specified. That is, the configuration of invention 29 is a gas engine according to any of the inventions 1 or 3 to 28, provided with a knocking sensor that detects an occurrence of knocking, and a hydrogen supply amount control means that receives output from the knocking sensor and measures the knocking intensity, and, when a predetermined value of knocking intensity is exceeded, reduces the mixing proportion of hydrogen in the total fuel supplied to the combustion chamber.

A condition in which knocking occurs is when the methane number becomes too low due to the influence of hydrogen components in the supplied fuel. For this reason, it is effective to reduce the supply amount of hydrogen in this condition to increase the methane number and prevent knocking. That is, the hydrogen supply amount control means receives output from the knocking sensor and measures the knocking intensity, and when an occurrence of knocking is detected or predicted, the mixing proportion of hydrogen in the total fuel supplied can be reduced. In this way, the methane number of the supplied fuel is increased, and the occurrence of knocking can be avoided.

The gas engine corresponding to claim 19 of the present invention (hereafter "invention 30") is a gas engine in which the operation of adjusting the mixing proportions of hydrogen and hydrogen-separated reformed fuel is explicitly specified. That is, the configuration of invention 30 is a gas engine according to any of the inventions 10 to 12, 28, or 29, provided with a mixing ratio adjustment means for adjusting the mixing proportions of hydrogen and hydrogen-separated reformed fuel. In order to reduce harmful substances, namely NOx, CO, and HC, in the exhaust gas as much as possible, it is preferable to perform lean combustion. For this reason, the mixing ratio adjustment means identifies in advance the mixing proportion of hydrogen in the total fuel, and in order to enable favorable combustion in the combustion chamber with the minimum required supply amount of fuel for that mixing proportion of hydrogen, it obtains the threshold limit for enabling lean combustion in accordance with the mixing proportion of hydrogen, and, based on that, adjusts the above-described mixing proportion. In this way, the engine can be operated with lean combustion, and harmful substances in the exhaust gas can be reduced.

The gas engine corresponding to claim 20 of the present invention (hereafter "invention 31") is a gas engine in which pure hydrogen is made use of as a fuel in the above-described gas engines.

BEST MODE FOR CARRYING OUT THE INVENTION

Referring to the accompanying drawings, the following is an explanation of embodiments of the present invention. Respective explanations will be given here for several embodiments in which 6C gas (a fuel containing a comparatively large proportion of hydrogen components) is used as fuel, and for several embodiments in which pure hydrogen gas is used as fuel. Furthermore, the gas engine in each embodiment uses the output therein for power generation.

EMBODIMENTS IN WHICH 6C GAS IS USED AS FUEL

Embodiment 1

Figure 1:
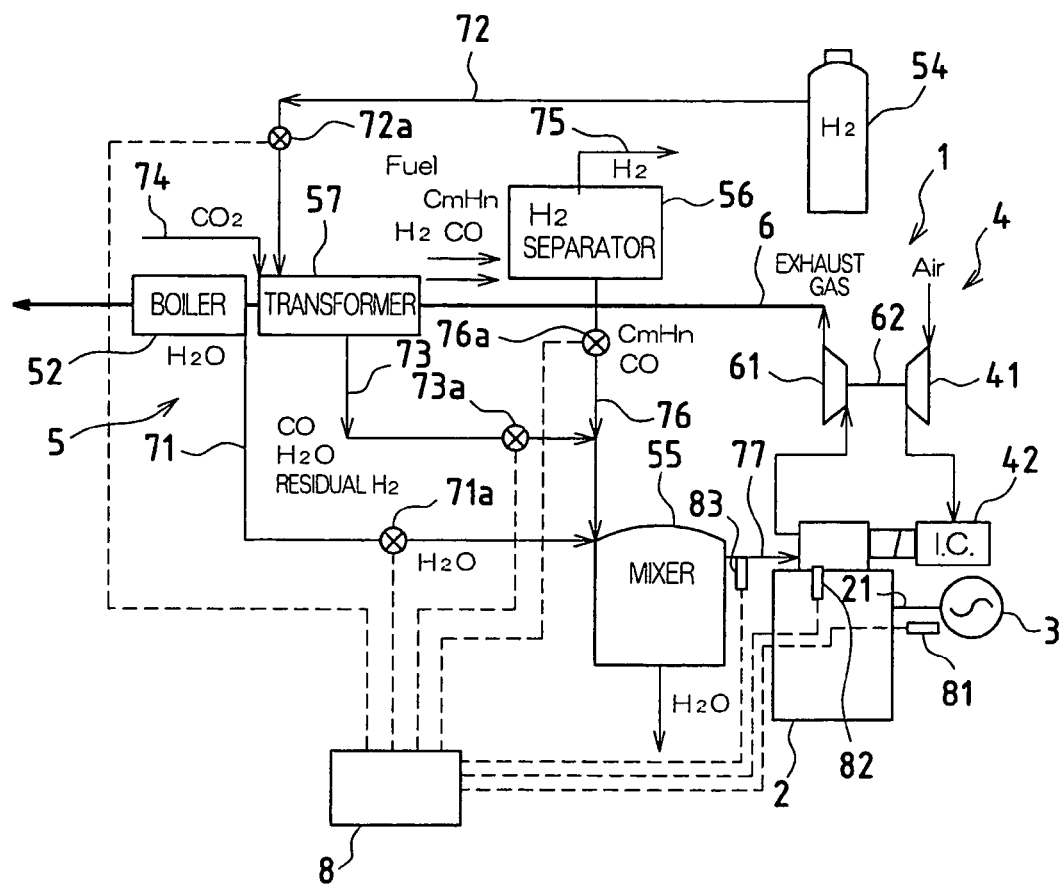
FIG. 1 is a block diagram that shows an overall configuration of a power generating system that generates power with a gas engine according to Embodiment 1.

FIG. 1 is a block diagram that shows an overall configuration of a power generating system that generates power with a gas engine 1 according to this embodiment. As the diagram shows, this gas engine 1 is configured so that an output shaft 21 that extends from an engine unit 2 is connected to a power generating device 3, and power is generated by the power generating device 3 with the rotational driving force of the output shaft 21.

Furthermore, the air intake system of the gas engine 1 contains an air supply system 4 and a fuel supply system 5. A gaseous mixture of air supplied from the air supply system 4 and fuel supplied from the fuel supply system 5 is supplied to a combustion chamber not shown in the diagram of the engine unit 2, so that the engine unit 2 can drive. The following is an explanation of the air supply system 4 and the fuel supply system 5.

The air supply system 4 is provided with a supercharger (compressor) 41 and an intercooler 42. Air is compressed by the supercharger 41, then this air is cooled by the intercooler 42, enabling high density air to be supplied to the combustion chamber. It should be noted that the supercharger 41 is directly coupled to an output shaft 62 of a turbine 61 provided at an exhaust tube 6 through which exhaust gas passes, and compresses air with the rotational output of the turbine 61.

On the other hand, the fuel supply system 5 is provided with an exhaust heat boiler 52 as a means for producing water vapor, a transformer 57, a hydrogen tank 54, a mixer 55, and a hydrogen separating device 56 as a means for separating hydrogen. At the fuel supply system 5, a transformational reaction ($H_2+CO_2 \rightarrow CO+H_2O$) between hydrogen ($H_2$) and carbon dioxide ($CO_2$) is caused, changing the composition of the fuel, and this fuel with a changed composition is supplied to the combustion chamber of the engine unit 2. Furthermore, the thermal energy required for this transformational reaction is obtained from the exhaust gas that passes through the exhaust tube 6. The following is an explanation of the elements that constitute the fuel supply system 5.

Water is stored inside the exhaust heat boiler 52, and, by performing heat transfer between this water and the exhaust gas passing through the exhaust tube 6, water is vaporized to produce water vapor. The exhaust heat boiler 52 and the mixer 55 are connected by a water vapor supply tube 71, and the water vapor ($H_2O$) produced inside the exhaust heat boiler 52 can be supplied to the inside of the mixer 55. Furthermore, the water vapor supply tube 71 is provided with an electrically-driven valve 71a that is aperture-adjustable.

The transformer 57 causes the hydrogen and the carbon dioxide within itself to undergo a transformational reaction ($H_2+CO_2 \rightarrow CO+H_2O$), changing the composition of the fuel. The transformer 57 is connected to the hydrogen tank 54 via a hydrogen supply tube 72, and the hydrogen stored inside the hydrogen tank 54 can be supplied to the inside of the transformer 57. Furthermore, the hydrogen supply tube 72 is provided with an electrically-driven valve 72a that is aperture-adjustable. Additionally, the transformer 57 is connected to the mixer 55 by a transformed fuel supply tube 73, and the fuel (CO, $H_2O$, and residual $H_2$) that has been transformed by the transformer 57 can be supplied to the inside of the mixer 55. Furthermore, the transformed fuel supply tube 73 is provided with an electrically-driven valve 73a that is aperture-adjustable. Additionally, a carbon dioxide supply tube 74 is connected to the transformer 57, and carbon dioxide ($CO_2$) can be supplied from, for example, a carbon dioxide tank that is not shown in the drawing.

The hydrogen separating device 56 separates and extracts hydrogen ($H_2$) from fuel ($C_mH_n$, $H_2$, CO, etc). An explicit configuration of the hydrogen separating device 56 is one provided with a built-in separation membrane and hydrogen adsorbing material, by which it is possible to separate and extract only hydrogen. Examples of separation membranes include palladium alloys, cellulose acetate membranes, polyimide, polyamide, porous polysulfone film/silicone, and so on. And hydrogen absorbing alloys can be given as an example of hydrogen absorbing materials. Furthermore, carbon nanofibers, fullerene, multilayer fullerene, and other materials made from carbon molecules can be employed as a hydrogen absorbing material. It should be noted that the separation membrane and the hydrogen absorbing material are not limited to these, and it is possible to employ a variety of materials as long as the material can separate and extract hydrogen. Furthermore, the hydrogen separating device 56 is connected to the hydrogen tank 54 via a separated-hydrogen supply tube 75, and to the mixer 55 via a hydrogen-separated fuel supply tube 76. In short, the hydrogen separating device 56 makes it possible to collect separated and extracted hydrogen ($H_2$) in the hydrogen tank 54, and to supply the hydrogen-separated fuel ($C_mH_n$) to the mixer 55. The hydrogen-separated fuel supply tube 76 described above is provided with an electrically-driven valve 76a that is aperture-adjustable.

The mixer 55, into which water vapor is supplied by the water vapor supply tube 71 and fuel is supplied by each of the fuel supply tubes 73 and 76, temporarily stores and mixes the water vapor and each fuel. After excess $H_2O$ is removed by a dehumidifier provided inside the mixer 55 but not shown in the drawing, fuel to which water vapor has been admixed is mixed with air through a mixed fuel supply tube 77 and supplied to the combustion chamber of the engine unit 2.

Furthermore, a controller 8 is provided in the gas engine 1 to perform control for each portion. A plurality of sensors 81, 82, and 83 are connected to the controller 8, and each of the above-described electrically-driven valves 71a, 72a, 73a, and 76a performs aperture control upon reception of a detection signal from these sensors 81, 82, and 83. Examples of the sensors include: a load sensor 81 that detects the load of the power generating device 3, a knocking sensor 82 for measuring the knocking intensity of the engine unit 2, and a hydrogen concentration sensor 83 that measures the concentration of hydrogen components (the concentration of hydrogen components in the mixed fuel supply tube 77) in the fuel supplied from the mixer 55 to the engine unit 2. The above has been an explanation of the configuration of the gas engine 1.

The following is an explanation of the operations of the thus-configured gas engine 1. These operations are performed when the electrically-driven valves 71a, 72a, 73a, and 76a are all in an open state.

First, the water inside the exhaust heat boiler 52 is heated by the exhaust gas passing through the exhaust tube 6 and made into water vapor. Then, this water vapor is successively supplied to the mixer 55 by the water vapor supply tube 71.

At the same time, hydrogen gas from the hydrogen supply tube 72, and carbon dioxide from the carbon dioxide supply tube 74 are supplied to the inside of the transformer 57. Furthermore, the inside of the transformer 57 is heated by the exhaust gas passing through the exhaust tube 6. This causes the hydrogen and carbon dioxide to undergo a transformational reaction ($H_2 + CO_2 \rightarrow CO + H_2O$) inside the transformer 57, changing the composition of the fuel. This transformed fuel is supplied to the inside of the mixer 55 by the transformed fuel supply tube 73. In short, a fuel with a reduced amount of hydrogen components is produced by this transformational reaction, and this fuel is supplied to the inside of the mixer 55.

Furthermore, hydrogen is separated from hydrocarbon-based fuel by the hydrogen separating device 56. This separated hydrogen is collected at the hydrogen tank 54 via a separated-hydrogen supply tube 75, and the fuel from which hydrogen has been separated is supplied to the mixer 55 by the hydrogen-separated fuel supply tube 76. In short, the fuel supplied to the mixer 55 by the hydrogen-separated fuel supply tube 76 has a reduced hydrogen concentration.

In this way, the water vapor and each of the fuels that are supplied to the mixer 55 are mixed inside the mixer 55, then successively supplied to the combustion chamber of the engine unit 2 through the mixed fuel supply tube 77. At this point, because the fuel has water vapor mixed in, the overall heat capacity of the fuel is comparatively high. The engine unit 2 is driven by the supply of this fuel, and power is generated from the drive of the power generating device 3 with the rotational drive of the output shaft 21.

In this way, in this embodiment, the amount of hydrogen components in the fuel is reduced by the transformational reaction inside the transformer 57, and the overall heat capacity of the fuel is increased with the mixing in of water vapor to the fuel. And, still more, the hydrogen concentration of the supplied fuel is reduced by hydrogen separation. This lowers the combustion velocity inside the combustion chamber, enabling the occurrence of backfiring to be inhibited. It also raises the methane number of the fuel, suppressing the occurrence of knocking. And, still more, it reduces the rate of heat generation, thus achieving improved engine thermal efficiency.

Embodiment 2

The following is an explanation of Embodiment 2. In this embodiment, the supply source is provided for supplying carbon dioxide to the transformer 57 is addressed more specifically. The rest of the configuration is the same as that described above in Embodiment 1. Consequently, only the points that differ from Embodiment 1 will be explained here.

Figure 2:
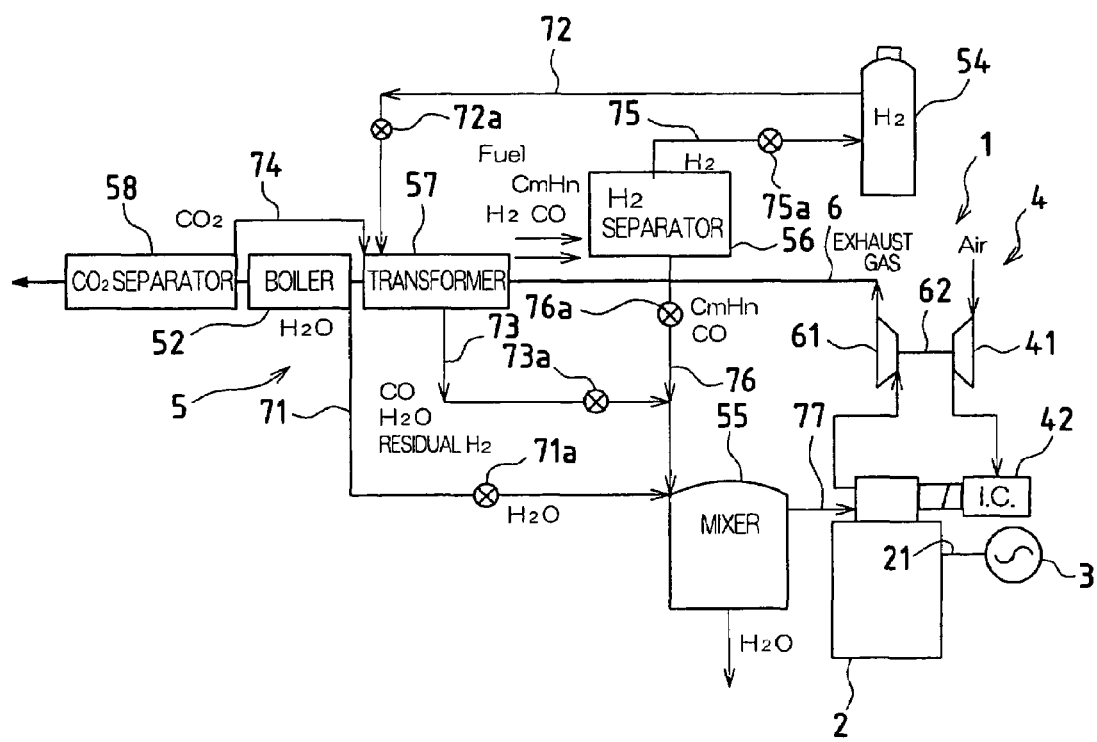
FIG. 2 is a diagram of Embodiment 2 corresponding to FIG. 1.

FIG. 2 is a block diagram that shows an overall configuration of a power generating system that generates power with the gas engine 1 according to this embodiment (controller and sensors omitted). As the diagram shows, this gas engine 1 is provided with a $CO_2$ separating device 58 as a means for separating $CO_2$. The $CO_2$ separating device 58 separates and extracts carbon dioxide from the exhaust gas that passes through the exhaust tube 6. As in the hydrogen separating device 56, a separation membrane is used in this configuration to separate and extract carbon dioxide. Furthermore, the $CO_2$ separating device 58 and the transformer 57 are connected by a carbon dioxide supply tube 74, and the carbon dioxide that is separated and extracted inside the $CO_2$ separating device 58 can be successively supplied to the transformer 57.

Furthermore, the supply source for supplying hydrogen to the transformer 57 is the same hydrogen tank 54 as that in Embodiment 1, and hydrogen separated and extracted by the hydrogen separating device 56 is successively supplied to the hydrogen tank 54 via the separated-hydrogen supply tube 75. It should be noted that, the separated-hydrogen supply tube 75 is provided with an electrically-driven valve 75a that is aperture-adjustable.

With this embodiment, carbon dioxide separated and extracted from the exhaust gas is used effectively so that a transformational reaction can be caused in the transformer 57, thus there is no need to provide a special supply source of carbon dioxide. Furthermore, hydrogen separated and extracted from the fuel is used effectively so that a transformational reaction can be caused in the transformer 57, thus there is no need to provide a special supply source of hydrogen. For this reason, tasks such as replacing the supply sources of carbon dioxide and hydrogen, and the tasks of filling these gases, become unnecessary, thus making it possible to achieve improved maintainability.

Embodiment 3

The following is an explanation of Embodiment 3. In this embodiment, a desulfurizing device and a fuel reforming device are provided. The rest of the configuration is the same as that described above in Embodiment 2. Consequently, only the points that differ from Embodiment 2 will be explained here.

Figure 3:
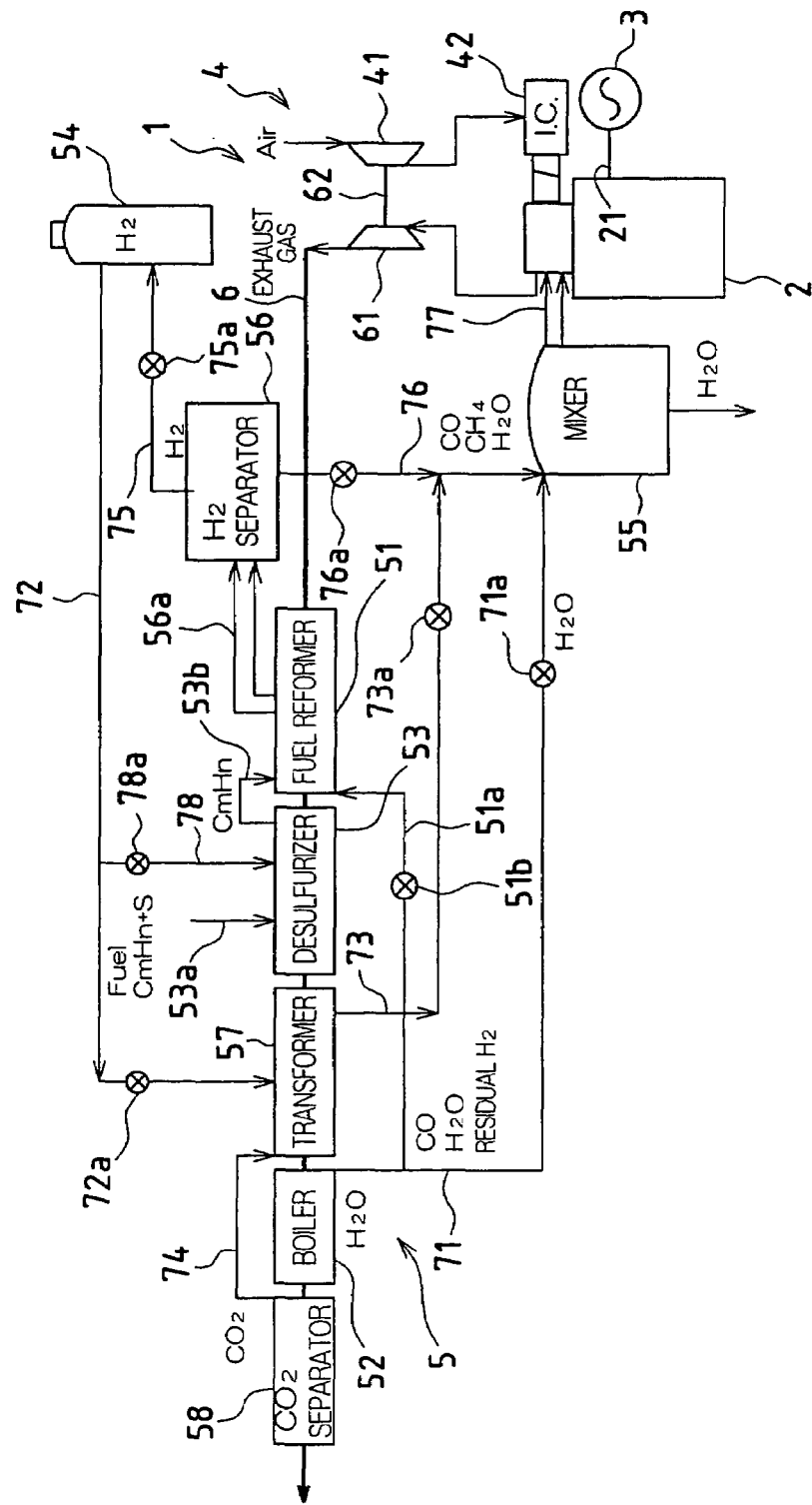
FIG. 3 is a diagram of Embodiment 3 corresponding to FIG. 1.

FIG. 3 is a block diagram that shows an overall configuration of a power generating system that generates power with the gas engine 1 according to this embodiment. As the diagram shows, the gas engine 1 is provided with a desulfurizing device 53 and a fuel reforming device 51.

The desulfurizing device 53 is for the purpose of removing the sulfur content contained in hydrocarbon-based fuels. That is, the catalysts of the fuel reforming device 51 (metals (Ni), alkaline carbonates ($K_2CO_3$), basic oxides (CaO), minerals such as mineral coal ($FeS_2$) and so on) pose the risk of sulfur poisoning, and the desulfurizing device 53 is provided in order to avoid this. Furthermore, because a desulfurizing operation is carried out in the desulfurizing device 53 by hydrogenation-desulfurization, a hydrogen supply tube 78 for the purpose of desulfurization, and that is branched off from the hydrogen supply tube 72, is connected to the desulfurizing device 53. The hydrogen supply tube 78 for the purpose of desulfurization is provided with an electrically-driven valve 78a that is aperture-adjustable. In other words, a portion of the hydrogen inside the hydrogen tank 54 is supplied to the desulfurizing device 53 for the purpose of hydrogenation-desulfurization. Additionally, a pre-reformed fuel supply tube 53a for supplying hydrocarbon-based fuel, and a desulfurized fuel supply tube 53b for supplying desulfurized fuel to the fuel reforming device 51 are connected to the desulfurizing device 53.

The fuel reforming device 51 causes an endothermic reaction to occur within itself between water vapor and hydrocarbon-based fuel, thus performing a fuel-reforming operation. In short, a branch tube 51a that branches off from the water vapor supply tube 71 is connected to the fuel reforming device 51. The branch tube 51a is provided with an electrically-driven valve 51b that is aperture-adjustable. Moreover, the fuel reforming device 51 causes an endothermic reaction between the supplied water vapor and the hydrocarbon-based fuel supplied from the desulfurnized fuel supply tube 53b. Furthermore, a heat exchanging device that is not shown in the drawing is provided inside the fuel reforming device 51 in order to obtain thermal energy from the exhaust gas. This enables the endothermic reaction ($C_mH_n + mH_2O \rightarrow mCO + (n/2+m)H_2$) to occur within the fuel reforming device 51 in an environment of a predetermined temperature (with the temperature of exhaust gas, approximately 600° C. for example).

By carrying out a reaction such as this, the calorific value of the reformed fuel is greatly increased above that of the original hydrocarbon-based fuel, and this makes it possible to obtain a fuel that achieves improved thermal efficiency (power generator output/supplied fuel).

Moreover, the fuel reforming device 51 and the hydrogen separating device 56 are connected by a reformed fuel supply tube 56a, and the fuel that has been reformed by the fuel reforming device 51 is supplied to the hydrogen separating device 56.

Figure 6:
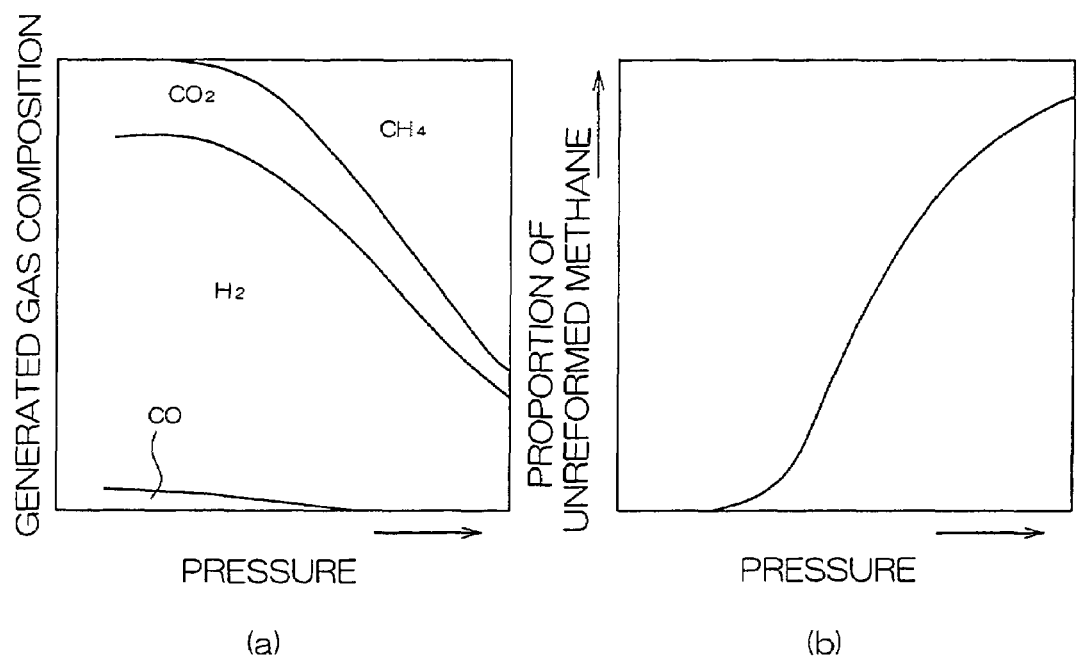
FIG. 6($a$) is a graph showing the relationship between the internal pressure of the fuel reforming device and the gas composition generated after the reforming reaction when methane gas is used as fuel, and FIG. 6($b$) is a graph showing the relationship between the internal pressure of the fuel reforming device and the proportion of unreformed methane when methane gas is used as fuel.

Furthermore, although not shown in the diagram, the fuel reforming device 51 is provided with a pressure-reducing mechanism that is capable of reducing the pressure inside the fuel reforming device 51. By reducing the pressure inside the fuel reforming device 51, a sufficient reforming reaction can be performed even if the temperature (exhaust gas temperature) of the heat source that heats the fuel reforming device 51 is comparatively low, thus making it possible to obtain a high conversion rate. FIG. 6(a) is a graph showing the relationship between the pressure inside the fuel reforming device 51 and the generated gas composition after a reforming reaction when methane gas is used as fuel. FIG. 6(b) is a graph showing the relationship between the pressure inside the fuel reforming device 51 and the proportion of unreformed methane when methane gas is used as fuel. As can be seen from these graphs, the lower the pressure inside the fuel reforming device 51, the better the reforming of the methane gas.

With the configuration of this embodiment, a fuel with a high calorific value is obtained by reforming the hydrocarbon-based fuel, thus enabling improved thermal efficiency to be achieved for the engine. Furthermore, as it is possible to use fuels other than hydrocarbon-based fuels, it is possible to facilitate the realization of fuel diversification. In other words, it is possible to freely select hydrocarbon-based fuels and fuels other than hydrocarbon-based fuels for a gas engine of the same configuration, thus achieving wider versatility for gas engines.

Embodiment 4

The following is an explanation of Embodiment 4. In this embodiment, the fuel reforming device 51 and the hydrogen separating device 56 are integrally configured. The rest of the configuration is the same as that described above in Embodiment 3. Consequently, only the points that differ from Embodiment 3 will be explained here.

Figure 4:
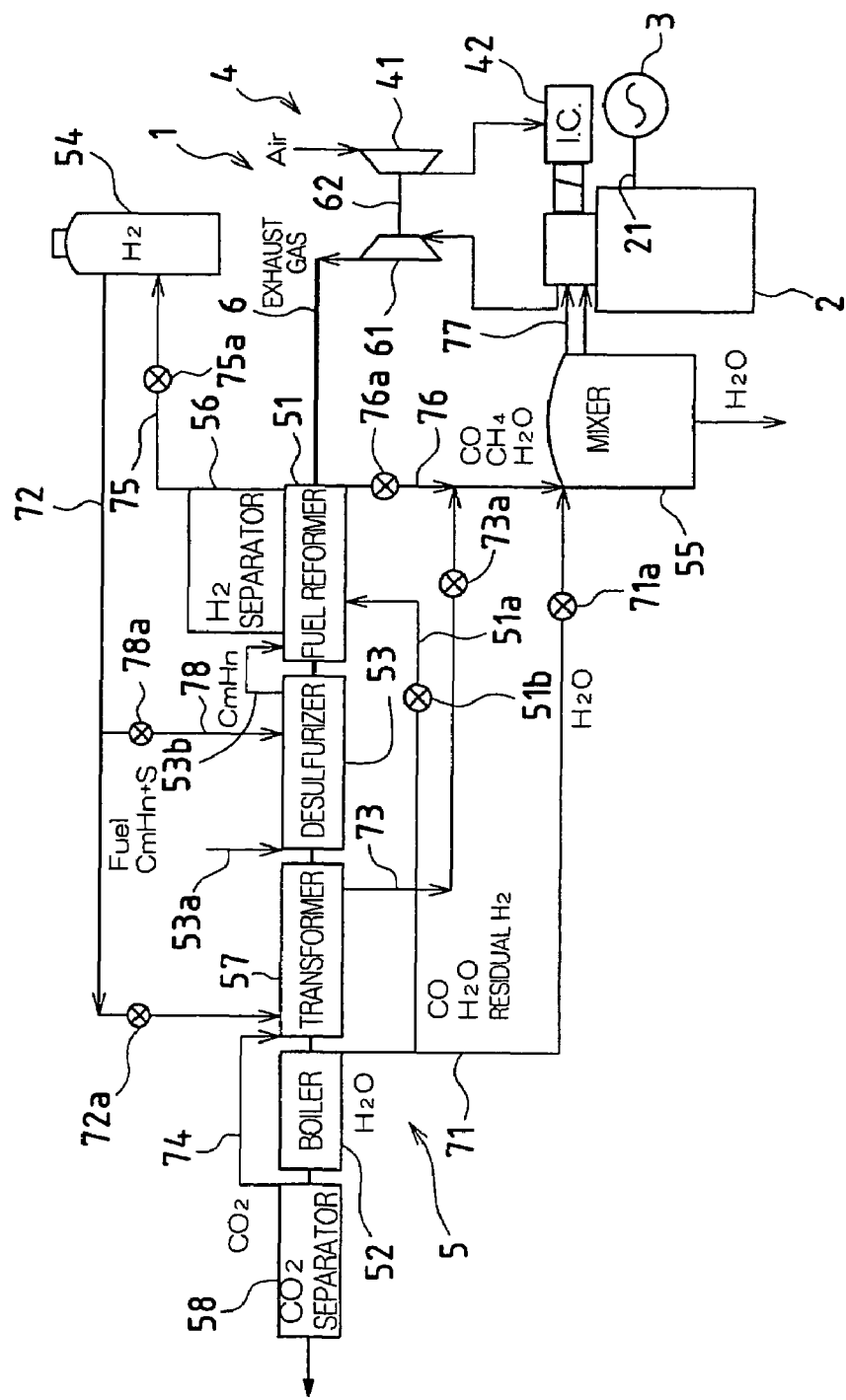
FIG. 4 is a diagram of Embodiment 4 corresponding to FIG. 1.

FIG. 4 is a block diagram that shows an overall configuration of a power generating system that generates power with the gas engine 1 according to this embodiment. As the diagram shows, the fuel reforming device 51 and the hydrogen separating device 56 are an integrated construction in this gas engine 1. That is to say, the space inside the fuel reforming device 51 and the space inside the hydrogen separating device 56 are continuous, and the fuel reformed by the fuel reforming device 51 is supplied from the fuel reforming device 51 to the hydrogen separating device 56, and hydrogen is separated and extracted by the hydrogen separating device 56.

With the configuration of this embodiment, the fuel reforming device 51 and the hydrogen separating device 56 do not need to be connected by piping, thus making it possible to achieve simplification of the manufacturing process for the gas engine 1, as well as enabling compactness for the engine 1 as a whole.

Embodiment 5

The following is an explanation of Embodiment 5. In this embodiment, an oxidation catalyst device and a hydrogen absorbing device are provided. The rest of the configuration is the same as that described above in Embodiment 4. Consequently, only the points that differ from Embodiment 4 will be explained here.

Figure 5:
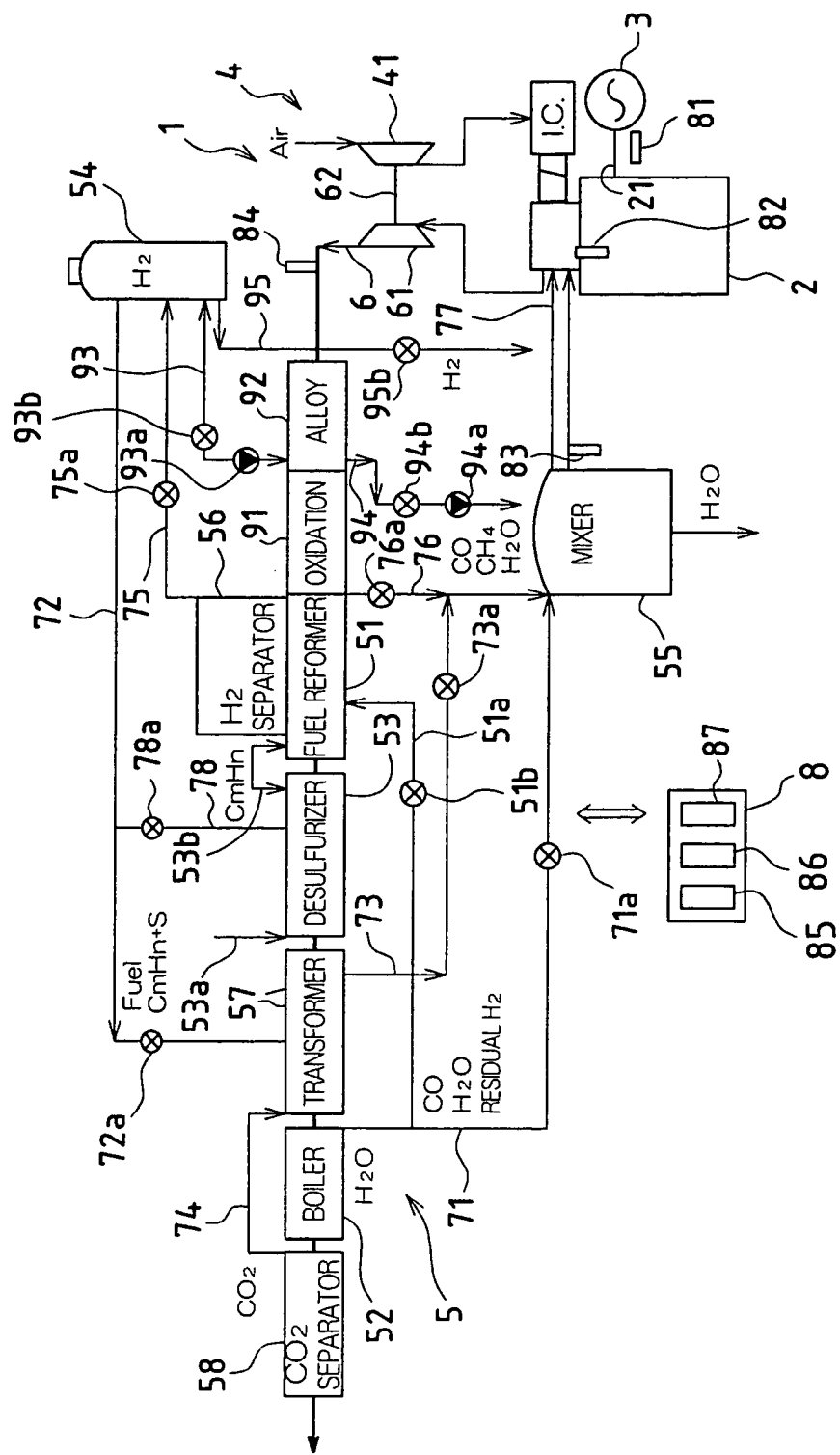
FIG. 5 is a diagram of Embodiment 5 corresponding to FIG. 1.

FIG. 5 is a block diagram that shows an overall configuration of a power generating system that generates power with the gas engine 1 according to this embodiment. As the diagram shows, the gas engine 1 is provided with the oxidation catalyst device 91 and the hydrogen absorbing device 92.

The oxidation catalyst device 91 combusts non-combusted components in the exhaust gas, and the temperatures inside the fuel reforming device 51 and the transformer 57 are raised above the temperature of the exhaust by this combustion. In other words, the temperatures inside the fuel reforming device 51 and the transformer 57 become higher, thus raising the temperature for the endothermic reaction that occurs in the fuel reforming device 51 and the temperature for the transformational reaction that occurs in the transformer 57 and promoting these reactions.

The hydrogen absorbing device 92 contains a hydrogen absorbing material such as a hydrogen absorbing alloy. Furthermore, the hydrogen absorbing device 92 is connected to the hydrogen tank 54 by a hydrogen dispensing tube 93, and also connected to the mixer 55 by a first hydrogen supply tube 94. These tubes 93 and 94 are respectively provided with pumps 93a and 94a, and electrically-driven valves 93b and 94b, which are aperture-adjustable. Furthermore, heat is generated when the hydrogen absorbing material contained inside the hydrogen absorbing device 92 absorbs hydrogen and generates hydrides. The temperatures inside the fuel reforming device 51 and the transformer 57 are also raised by this generated heat, thus raising the temperature for the endothermic reaction that occurs in the fuel reforming device 51 and the temperature for the transformational reaction that occurs in the transformer 57, thus enabling these reactions to be promoted.

Figure 7:
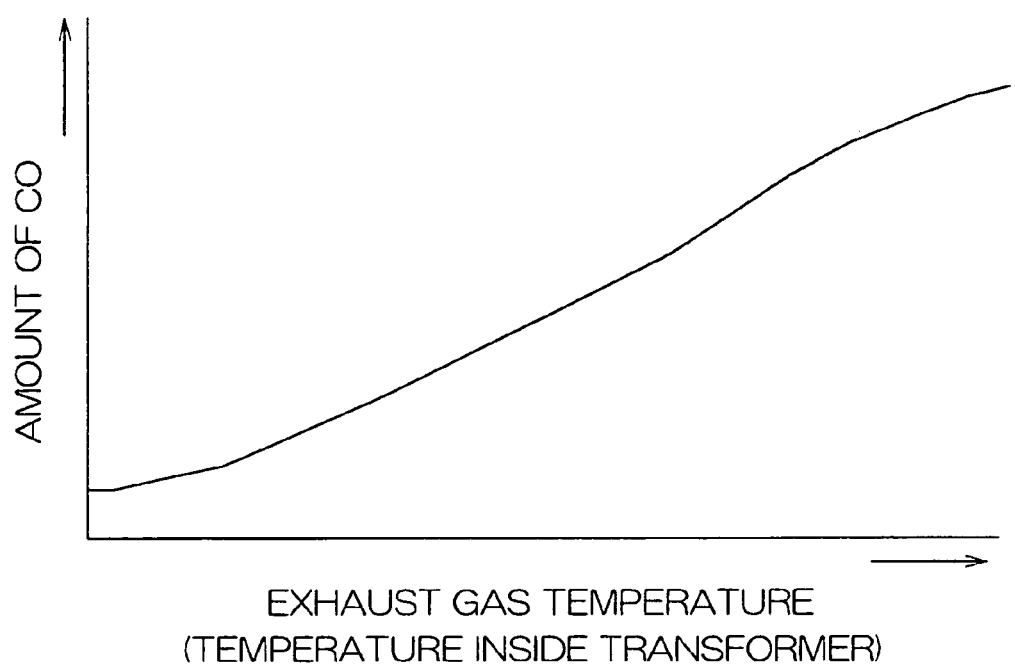
FIG. 7 is a graph showing the relationship between the temperature inside the transformer and the amount of CO generated through the transformational reaction in the transformer.

FIG. 7 is a graph showing the relationship between the temperature inside the transformer 57 and the amount of CO produced in the transformational reaction in the transformer 57. As can be seen from this graph, the higher the temperature inside the transformer 57, the greater the amount of CO produced. That is, it can be seen that the transformational reaction is promoted.

Figure 8:
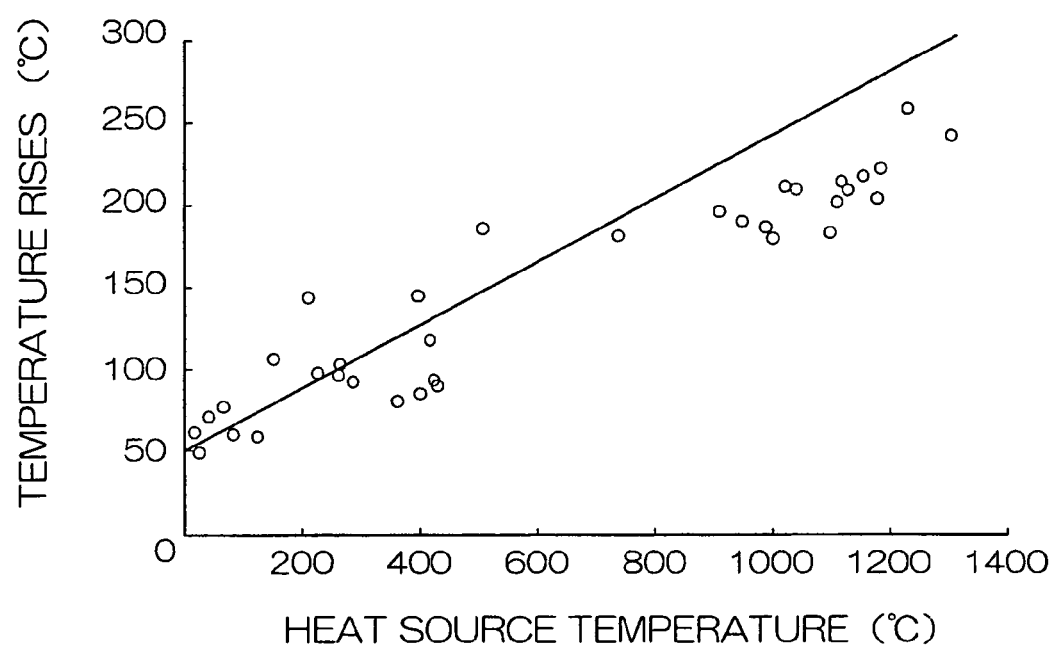
FIG. 8 is a graph showing the relationship between the atmospheric temperature (heat source temperature) inside the hydrogen absorbing device when hydrogen is absorbed in the hydrogen absorbing material and temperature rises (temperature rises brought about by the generation of heat in hydride generation).

FIG. 8 is a graph showing the relationship between the atmospheric temperature (heat source temperature) inside the hydrogen absorbing device 92 when hydrogen is absorbed by the hydrogen absorbing material, and temperature rises (temperature rises brought about by the generation of heat in hydride generation). In this way, the higher the atmospheric temperature inside the hydrogen absorbing device 92, the higher the temperature rises, thus enabling promotion of the endothermic reaction in the fuel reforming device 51 and the transformational reaction in the transformer 57. It should be noted that the circle marks in FIG. 8 indicate the actual measured point of each type of hydrogen absorbing material, and the straight line is an approximation of the characteristics of hydrogen absorbing materials. Specific examples of these hydrogen absorbing materials include titanium and vanadium series metals with manganese additives, magnesium and nickel series metals, zeolites, hydrocarbons, benzenes, and the like, as well as the various materials described above.

Furthermore, in the gas engine 1 of this embodiment, the hydrogen tank 54 and the mixer 55 are connected by a second hydrogen supply tube 95, enabling the hydrogen inside the hydrogen tank 54 to be supplied to the mixer 55. The second hydrogen supply tube 95 is provided with an electrically-driven valve 95b that is aperture-adjustable.

With this configuration, two routes are secured as hydrogen supply routes to the mixer 55: the route from the hydrogen absorbing device 92 through the first hydrogen supply tube 94, and the route from the hydrogen tank 54 through the second hydrogen supply tube 95. With this embodiment, hydrogen can be supplied to the mixer 55 in this manner.

Figure 9:
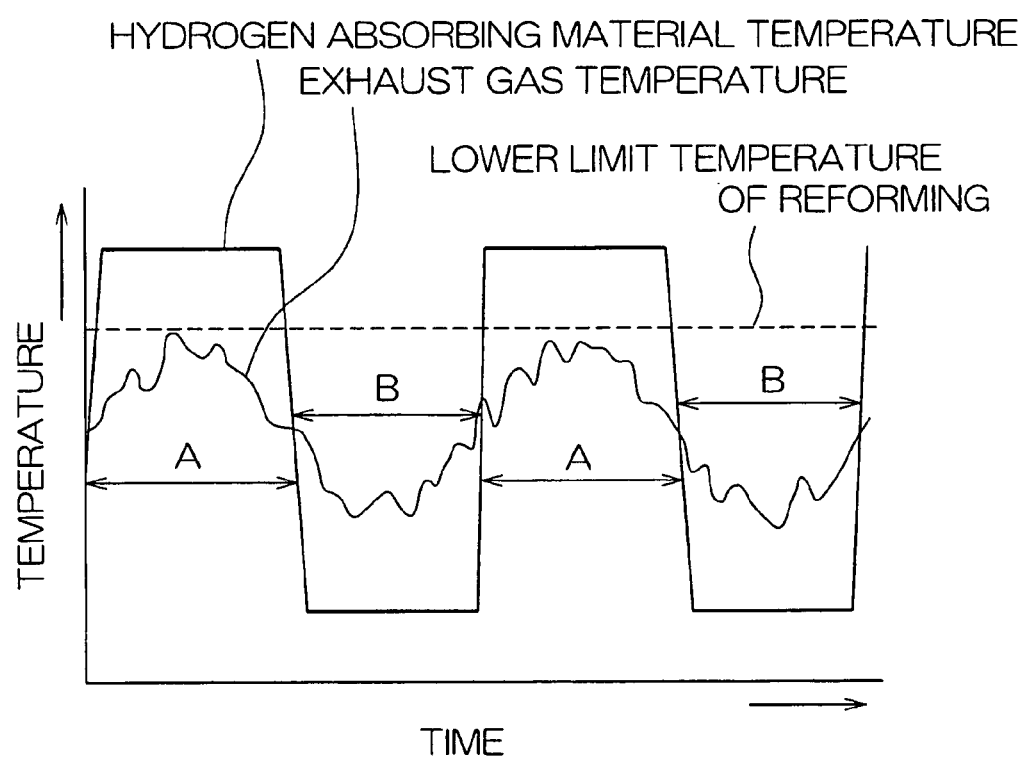
FIG. 9 is for the purpose of explaining the control operation in which hydrogen absorption and hydrogen desorption are caused by changing the pressure inside the hydrogen absorbing device in response to the fluctuating temperature inside the hydrogen absorbing device.

Also, one of the features for adjusting the amount of hydrogen supply in this embodiment is that hydrogen gas absorption and desorption are switchable in response to the temperature and pressure inside the hydrogen absorbing device 92. The following is a specific explanation of this. The gas engine in this embodiment is provided with an exhaust temperature sensor 84 that detects the temperature of the exhaust, and a pressure adjustment means not shown in the diagram for adjusting the pressure inside the hydrogen absorbing device 92. The temperature inside the hydrogen absorbing device 92 is governed by the temperature of the exhaust gas. In other words, the temperature inside the hydrogen absorbing device 92 can be obtained by detecting the temperature of the exhaust gas with the exhaust temperature sensor 84. As shown in FIG. 9, the temperature inside the hydrogen absorbing device 92 changes with the temperature of the exhaust gas, which changes in response to the load on the engine. The pressure inside the hydrogen absorbing device 92 changes here in response to the fluctuating temperature inside the hydrogen absorbing device 92, and this enables control of the hydrogen absorption and hydrogen desorption of the hydrogen absorbing device 92. Specifically, in areas with comparatively high exhaust gas temperatures (areas A in the diagram), the pressure inside the hydrogen absorbing device 92 can be set comparatively high by the pressure adjustment means so that hydrogen absorption can be carried out. When this happens, the temperature inside in the fuel reforming device 51 also rises due to the heat generated by hydride formation. On the other hand, in areas with comparatively low exhaust gas temperatures (areas B in the diagram), the pressure inside the hydrogen absorbing device 92 can be set comparatively low by the pressure adjustment means so that hydrogen desorption can be carried out. In other words, hydrogen absorbing materials can be caused to absorb heat with the desorption of hydrogen in areas with comparatively low exhaust gas temperatures, and hydrogen absorbing materials can be caused to produce heat with the absorption of hydrogen in areas with comparatively high exhaust gas temperatures, thus functioning as a so-called chemical heat pump. In this way, it becomes possible to freely control hydrogen absorption and hydrogen desorption by causing the pressure inside the hydrogen absorbing device 92 to change in response to the exhaust gas temperature.

Furthermore, the controller 8 is provided with an adjustment means 87 that enables free adjustments in the mixer 55 for the mixing proportions of hydrogen, transformed fuel, and hydrogen-separated reformed fuel. The adjustment means 87 adjusts the amount of transformed fuel supplied to the mixer 55 by adjusting the aperture of the electrically-driven valve 73a provided at the transformed fuel supply tube 73, and the amount of hydrogen supplied to the mixer 55 by controlling the pump 94a and adjusting the apertures of the electrically-driven valves 94b and 95b provided at the first and second hydrogen supply tubes 94 and 95, as well as the amount of hydrogen-separated reformed fuel supplied to the mixer 55 by adjusting the aperture of the electrically-driven valve 76a provided at the hydrogen-separated fuel supply tube 76. In this way, the mixing proportions of hydrogen, transformed fuel, and hydrogen-separated reformed fuel can be freely adjusted.

Furthermore, the controller 8 is provided with a hydrogen supply amount control means 85 and a mixing ratio adjustment means 86.

The hydrogen supply amount control means 85 receives the output of the above-mentioned knocking sensor 82 and measures the knocking intensity, and, when a predetermined value of knocking intensity is exceeded, reduces the supply amount of hydrogen by reducing the apertures of the electrically-driven valves 94b and 95b of the first and second hydrogen supply tubes 94 and 95, thus lowering the mixing proportion of hydrogen in the total fuel. In other words, when knocking is occurring, it is likely that the methane number has become too low due to the effect of hydrogen components in the supplied fuel, so knocking can be prevented in this situation by lowering the supply amount of hydrogen to raise the methane number.

Also, the mixing ratio adjustment means 86 receives the output of the above-mentioned hydrogen concentration sensor 83 and measures the mixing proportion of hydrogen in the total fuel, and adjusts the mixing proportions of the fuel and air that are supplied to the combustion chamber in response to the mixing proportion of hydrogen. In other words, in order to reduce the harmful substances NOx, CO, and HC in the exhaust gas as much as possible, it is preferable to perform lean combustion. For this reason, the mixing proportion of hydrogen in the total fuel is identified in advance to enable favorable combustion in the combustion chamber with the minimum required supply amount of fuel for that mixing proportion of hydrogen, that is, the threshold limit for enabling lean combustion is obtained in accordance with the mixing proportion of hydrogen, and, based on that, the mixing proportion of fuel and air is adjusted. In this way, harmful substances in the exhaust gas of the gas engine 1 can be greatly reduced, and it is possible to achieve cleaner exhaust gases.

EMBODIMENTS IN WHICH PURE HYDROGEN GAS IS USED AS FUEL

The following Embodiments 6 to 8 use pure hydrogen gas as fuel. The gas engine of Embodiment 6 is the gas engine of Embodiment 1 applied as a pure hydrogen engine. The gas engine of Embodiment 7 is the gas engine of Embodiment 2 applied as a pure hydrogen engine. The gas engine of Embodiment 8 is the gas engine of Embodiment 5 applied as a pure hydrogen engine. The following explanations of these embodiments will concern the points that differ from the above-mentioned embodiments.

Embodiment 6

Figure 10:
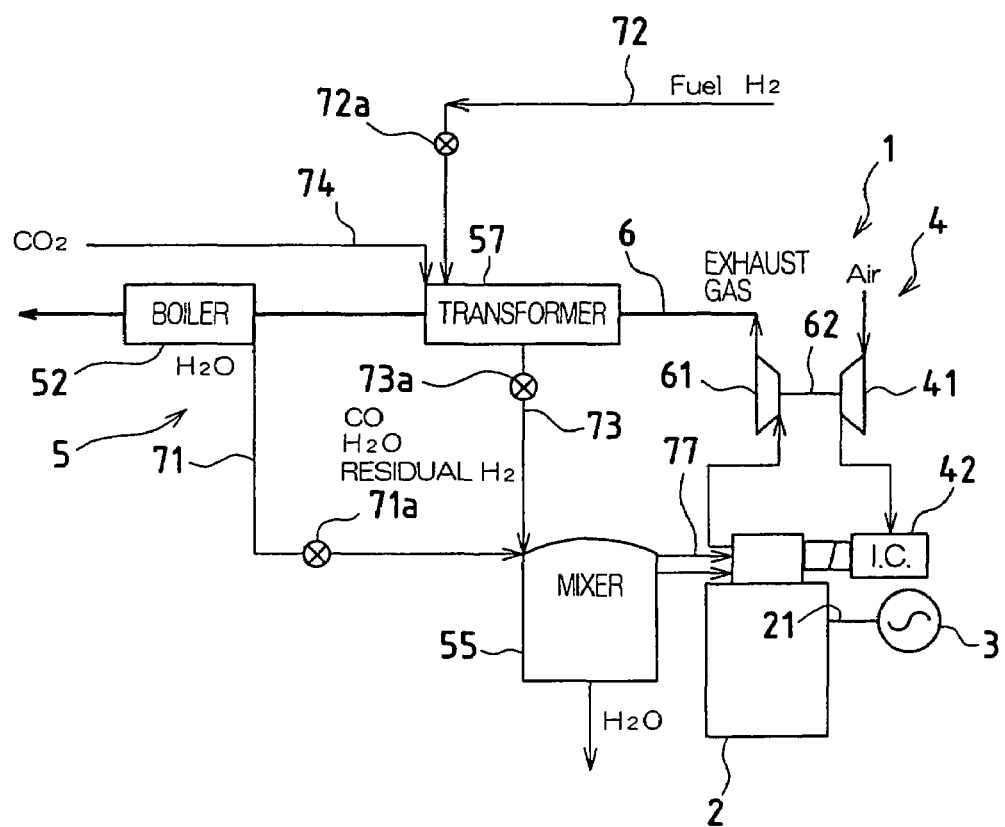
FIG. 10 is a diagram of Embodiment 6 corresponding to FIG. 1.

As shown in FIG. 10, the hydrogen separating device 56 of the gas engine of Embodiment 1 is eliminated in the gas engine 1 of this embodiment. In short, in this gas engine 1, water vapor produced by the exhaust heat boiler 52, and fuel formed by the mixer 57 are supplied to the mixer 55.

Embodiment 7

Figure 11:
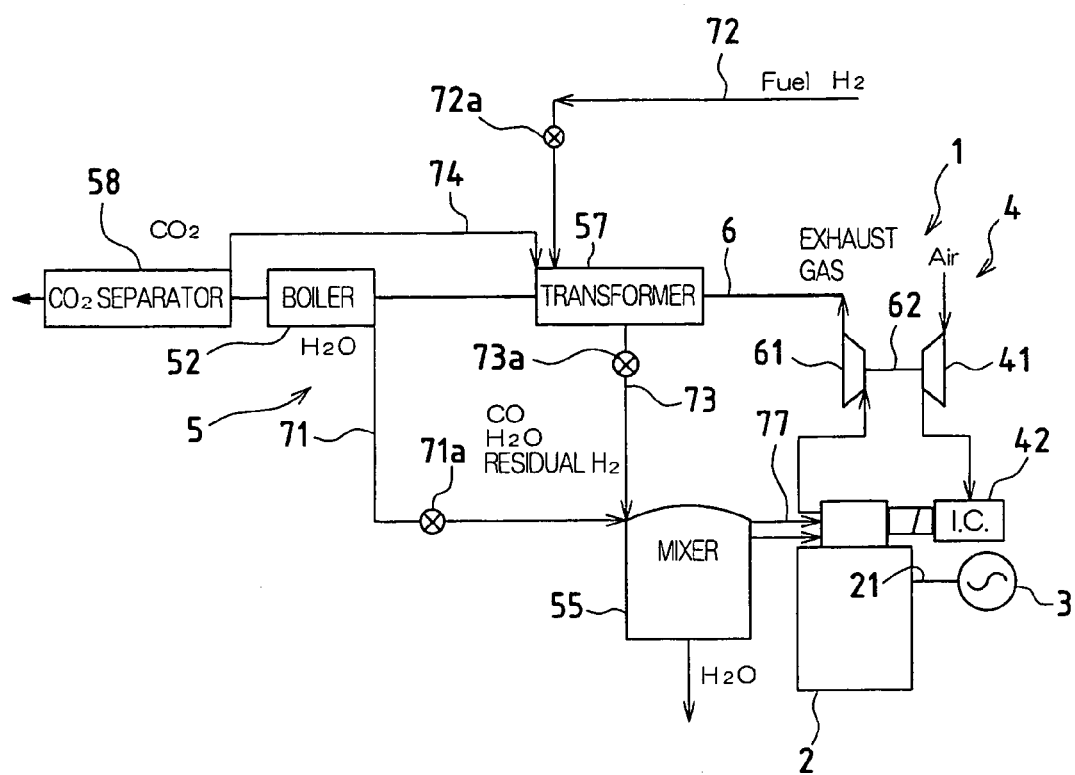
FIG. 11 is a diagram of Embodiment 7 corresponding to FIG. 1.

As shown in FIG. 11, the hydrogen separating device 56 of the gas engine of Embodiment 2 is eliminated in the gas engine of this embodiment. In short, in addition to the gas engine of Embodiment 6, the gas engine 1 here is configured so that carbon dioxide in the exhaust gas that passes through the exhaust tube 6 is separated and extracted by the $CO_2$ separating device 58, and this carbon dioxide is successively supplied to the transformer 57.

Embodiment 8

Figure 12:
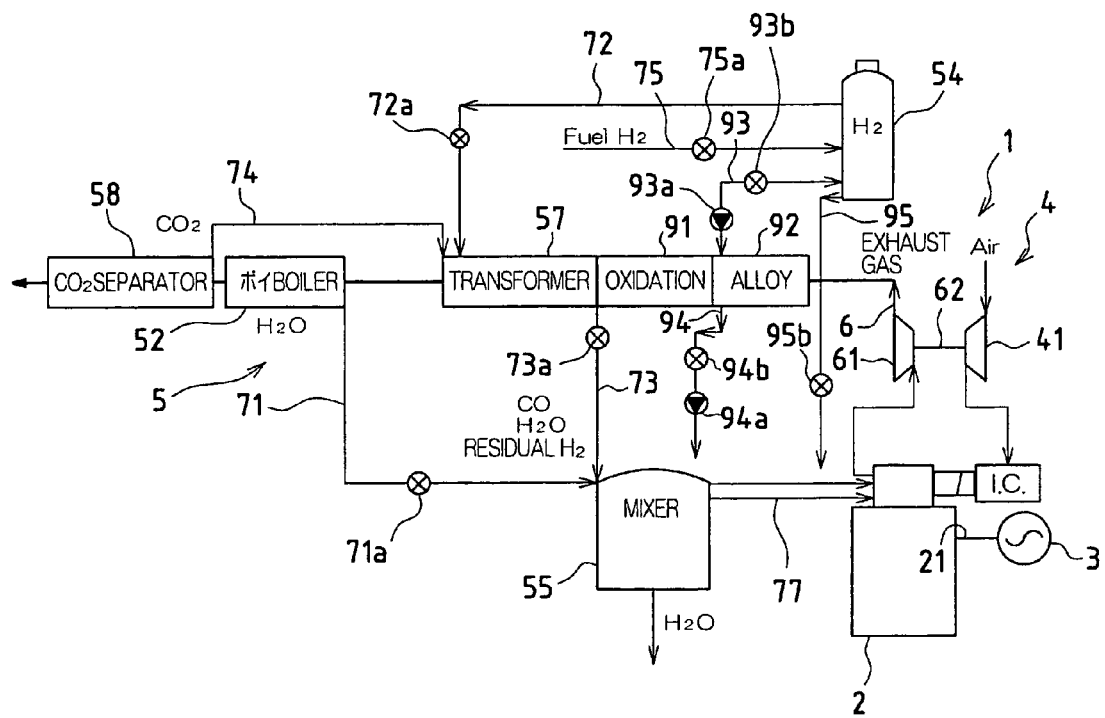
FIG. 12 is a diagram of Embodiment 8 corresponding to FIG. 1.
Figure 13:
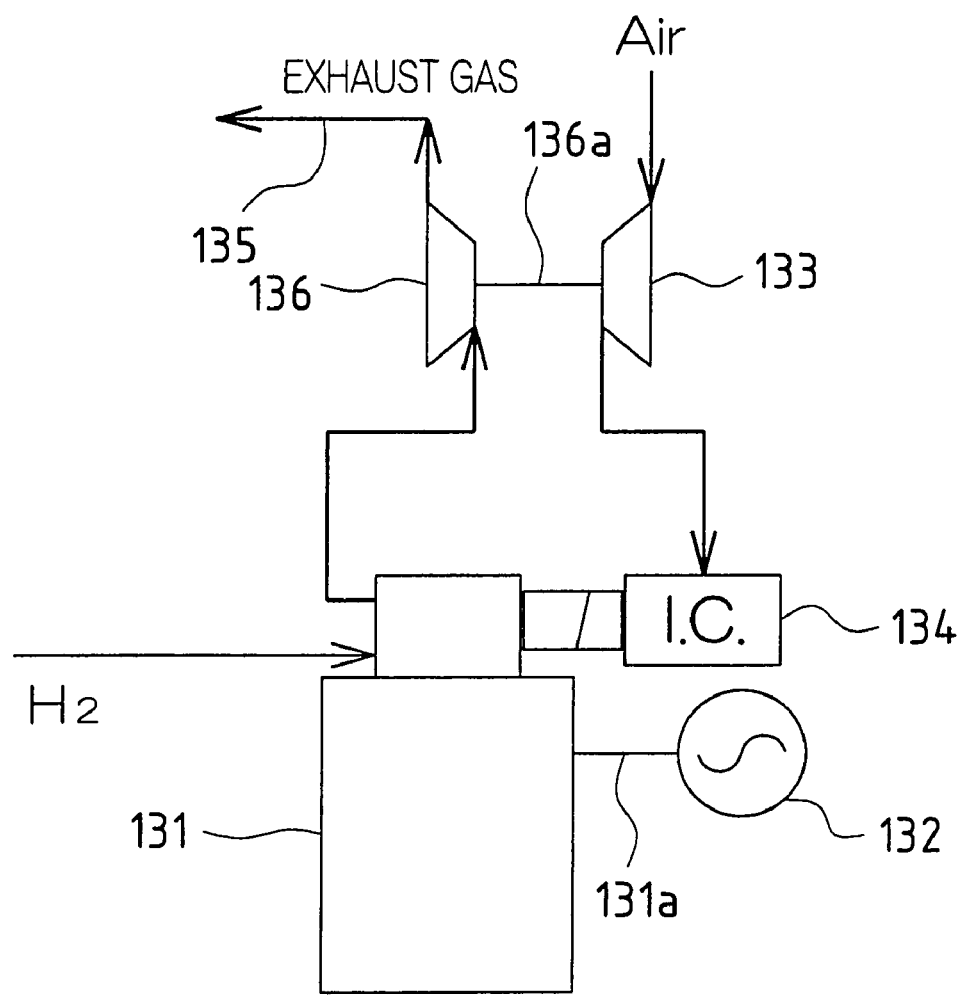
FIG. 13 is a diagram of a conventional example corresponding to FIG. 1.

As shown in FIG. 12, the hydrogen separating device 56, the fuel reforming device 51, and the desulfurizing device 53 of the gas engine of Embodiment 5 are eliminated in the gas engine of this embodiment. In short, in addition to the gas engine of Embodiment 7, in the gas engine 1 here, the reaction temperatures are raised by the oxidation catalyst device 91 and the hydrogen absorbing device 92 to achieve promotion of these reactions.

Other Embodiments

The explanations of the embodiments above concerned the cases of using 6C gas and pure hydrogen as fuels. However, the present invention is not limited to these, and 6B gas or other gases that contain hydrogen components can be made use of as the fuel. Furthermore, it is also possible to make use of natural gas, petroleum-based liquid fuels, sewage gas, biogas, alcohol fuels, and other such fuels as the hydrocarbon-based fuel.

Furthermore, the gas engine 1 is not limited to being used for power generation, and the present invention can be made use of in gas engines used in various applications.

Further still, in order to promote the transformational reaction in the transformer 57, it is possible to employ configurations in which a portion of the pre-transformation fuel or post-transformation fuel is combusted inside the transformer 57, or in which a portion of pre-reforming fuel or post-reforming fuel is combusted to raise the temperature inside the transformer 57.

Furthermore, in order to promote the reforming reaction in the fuel reforming device 51, it is possible to employ configurations in which a portion of pre-reforming fuel or post-reforming fuel is combusted inside the fuel reforming device 51, or in which a portion of pre-transformation fuel or post-transformation fuel is combusted to raise the temperature inside the fuel reforming device 51.

Furthermore, for Embodiments 1 to 5 above, explanation was given concerning cases using together a supply operation in which a fuel with a changed composition is supplied to the combustion chamber by a transformational reaction used in the transformer 57, a supply operation in which water vapor produced by the exhaust heat boiler 52 is supplied to the fuel supply system, and a supply operation in which fuel from which hydrogen has been separated and extracted by the hydrogen separating device 56 is supplied to the combustion chamber, but it is possible to employ two or more of these. Likewise, for Embodiments 6 to 8 above, explanation was given concerning cases of using together a supply operation in which a fuel with a changed composition is supplied to the combustion chamber by a transformational reaction used in the transformer 57, and a supply operation in which water vapor produced by the exhaust heat boiler 52 is supplied to the fuel supply system, but it is possible to employ either one of these alone.

Further still, the engine exhaust heat used by the fuel reforming device 51, the exhaust heat boiler 52, the transformer 57, and the hydrogen absorbing device 92 is not limited to the heat of exhaust gas, and the heat of engine coolants may also be used.

INDUSTRIAL APPLICABILITY

As shown above, for gas engines using fuels that contain hydrogen components, the gas engine of the present invention can reduce the amount of hydrogen components in the supplied fuel by changing the composition of the fuel with a transformational reaction between hydrogen and carbon dioxide, or by separating hydrogen from the fuel, and it can increase the heat capacity of the fuel by supplying water vapor to the fuel supply system, thus reducing the combustion velocity, raising the methane number of the fuel, and keeping down the rate of heat produced. In this way, the problems of conventional gas engines, namely backfiring, knocking, and low engine thermal efficiency, can be solved, thus achieving improvements in practicability for these engines.

Furthermore, when a means for reforming hydrocarbon-based fuel as a fuel is added to this gas engine, the thermal efficiency of the gas engine as a whole can be improved. Furthermore, it is possible to use fuels other than hydrogen-based fuels, so it is possible to facilitate the realization of fuel diversification.

Furthermore, when the temperature inside the transformer or the fuel reforming device is raised by using the combustion of a portion of pre-transformation fuel or post-transformation fuel, the combustion of a portion of pre-reforming fuel or post-reforming fuel, the combustion of non-combusted components in the exhaust gas, or the heat produced by the forming of hydrides during hydrogen absorption of the hydrogen absorbing materials, the transformational reaction and the reforming reaction can be caused to occur in a high-temperature environment, thus effectively achieving promotion of the reactions. For example, when using exhaust gas as the heat source for the reactions, each reaction can be caused to occur in a high-temperature environment even when the temperature of the exhaust gas is comparatively low, thus making it possible to achieve a high conversion rate.

Further still, when the fuel reforming device is configured to enable reduced internal pressure when reforming a hydrocarbon-based fuel, a sufficient reforming reaction can be performed even when the temperature of the heat source is comparatively low, and a high conversion rate can be obtained.

In addition to this, when controlling the formation of hydrides from hydrogen and hydrogen absorbing materials, and the separation of hydrogen from hydrogen absorbing materials by adjusting the pressure within the hydrogen absorbing device based on the temperature of the exhaust gas, the absorption and desorption of the hydrogen of the hydrogen absorbing material can be controlled easily even while effectively using the heat of the exhaust.

Furthermore, when preventing knocking in the engine by adjusting the supply amount of hydrogen, knocking can be reliably prevented, thus making it possible to achieve longer lives for gas engines.

The invention claimed is:

1. A gas engine that uses a fuel containing hydrogen components, comprising:
a transformer that uses engine exhaust heat as a heat source;
wherein a transformational reaction ($H_2+CO_2 \rightarrow CO+H_2O$) between hydrogen and carbon dioxide is caused to occur in the transformer, changing a composition of the fuel, and the fuel with a changed composition is supplied to a combustion chamber.

2. The gas engine according to claim 1,
wherein the engine exhaust system comprises a $CO_2$ separating means; and
wherein the carbon dioxide separated from the exhaust gas by the $CO_2$ separating means is supplied to the transformer.

3. The gas engine according to claim 1, comprising:
a hydrogen separating means for separating and extracting hydrogen from a fuel;
wherein the hydrogen separated by the hydrogen separating means is supplied to the transformer.

4. The gas engine according to claim 1,
wherein the fuel is a hydrocarbon-based fuel;
wherein the gas engine comprises a fuel reforming device that reforms fuel by using engine exhaust heat to cause an endothermic reaction ($C_mH_n+mH_2O \rightarrow mCO+(n/2+m)H_2$) between water vapor and the fuel; and
wherein a fuel reformed by the fuel reforming device is supplied to a combustion chamber.

5. The gas engine according to claim 4, wherein:
the hydrogen separating means that separates and extracts hydrogen from the fuel and the fuel reforming device are integrally configured, and wherein, while hydrogen is separated and extracted by the hydrogen separating means, a fuel reforming operation is performed by the fuel reforming device.

6. The gas engine according to claim 4:
wherein the temperature inside the transformer is raised by combusting a portion of pre-reforming fuel or post-reforming fuel.

7. The gas engine according to claim 4:
wherein the temperature inside the fuel reforming device is raised by combusting a portion of pre-reforming fuel or post-reforming fuel.

8. The gas engine according to claim 4:
wherein the temperature inside the fuel reforming device is raised by combusting a portion of pre-transformation fuel or post-transformation fuel.

9. The gas engine according to claim 4, comprising:
an oxidation catalyst device that causes non-combusted components in exhaust gas to be combusted;
wherein the temperature inside the fuel reforming device is raised above the temperature of the exhaust by the combustion of non-combusted components with the oxidation catalyst device.

10. The gas engine according to claim 4, comprising:
a hydrogen absorbing device that contains a hydrogen absorbing material and is capable of absorbing hydrogen;
wherein the temperature inside the fuel reforming device is raised above the temperature of the exhaust by the heat generated by hydride formation when the hydrogen absorbing material absorbs hydrogen.

11. The gas engine according to claim 4,
wherein the pressure inside the fuel reforming device can be reduced when a hydrocarbon-based fuel is reformed.

12. The gas engine according to claim 1:
wherein the temperature inside the transformer is raised by combusting a portion of pre-transformation fuel or post-transformation fuel.

13. The gas engine according to claim 1, comprising:
an oxidation catalyst device that causes non-combusted components in exhaust gas to be combusted;
wherein the temperature inside the transformer is raised above the temperature of the exhaust by the combustion of non-combusted components with the oxidation catalyst device.

14. The gas engine according to claim 1, comprising:
a hydrogen absorbing device that contains a hydrogen absorbing material and is capable of absorbing hydrogen;
wherein the temperature inside the transformer is raised above the temperature of the exhaust by the heat generated by hydride formation when the hydrogen absorbing material absorbs hydrogen.

15. The gas engine according to claim 14, comprising:
a tank that stores hydrogen;
wherein the hydrogen inside the tank is absorbed by the hydrogen absorbing material inside the hydrogen absorbing device, and hydrogen is drawn from the hydrogen absorbing device using engine exhaust heat and supplied to a combustion chamber.

16. The gas engine according to claim 14, comprising:
a tank that stores hydrogen;
wherein the hydrogen inside the tank is absorbed by the hydrogen absorbing material inside the hydrogen absorbing device on the one hand;
an exhaust temperature sensor that detects the temperature of the exhaust; and
a pressure adjustment means for adjusting the pressure inside the hydrogen absorbing device;
wherein, based on the exhaust temperature detected by the exhaust temperature sensor, the pressure adjustment means adjusts the pressure inside the hydrogen absorbing device, and controls the formation of hydrides of hydrogen and the hydrogen absorbing material, and the separation of hydrogen from the hydrogen absorbing material.

17. A gas engine according to claim 14, further comprising a tank that stores hydrogen, the hydrogen inside the tank is absorbed by the hydrogen absorbing material inside the hydrogen absorbing device;
an exhaust temperature sensor that detects the temperature of the exhaust; and
a pressure adjustment means for adjusting the pressure inside the hydrogen absorbing device,
wherein hydrogen is drawn from the hydrogen absorbing device using engine exhaust heat and supplied to a combustion chamber,
wherein, based on the exhaust temperature detected by the exhaust temperature sensor, the pressure adjustment means adjusts the pressure inside the hydrogen absorbing device, and controls the formation of hydrides of hydrogen and the hydrogen absorbing material, and the separation of hydrogen from the hydrogen absorbing material, and wherein the following operations are performed together;

a supply operation in which hydrogen drawn from the hydrogen absorbing device is supplied to a combustion chamber in the gas engine; and a control operation in which the formation of hydrides of hydrogen and the hydrogen absorbing material, and the separation of hydrogen from the hydrogen absorbing material is controlled by adjusting the pressure inside the hydrogen absorbing device in the gas engine.

18. The gas engine according to claim 1, comprising:

a knocking sensor that detects an occurrence of knocking; and a hydrogen supply amount control means that receives output from the knocking sensor and measures the knocking intensity, and, when a predetermined value of knocking intensity is exceeded, reduces the mixing proportion of hydrogen in the total fuel supplied to the combustion chamber.

19. The gas engine according to claim 18 comprising:

a mixing ratio adjustment means for adjusting the mixing proportions of hydrogen and hydrogen-separated reformed fuel.

20. The gas engine according to claim 1, wherein the fuel is a pure hydrogen fuel.

21. A gas engine that uses a fuel containing hydrogen components, comprising:

a hydrogen separating means for separating and extracting hydrogen from the fuel, a water vapor generating means for generating water vapor, and a mixer, wherein the fuel is a hydrocarbon-based fuel;

wherein the gas engine comprises a fuel reforming device that reforms fuel by using engine exhaust heat to cause an endothermic reaction ($C_mH_n+mH_2O \rightarrow mCO+(n/2+m)H_2$) between the water vapor generated by the water vapor generating means and the fuel; and wherein the fuel reformed by the fuel reforming device and from which hydrogen has been separated and extracted by the hydrogen separating means is supplied to a combustion chamber after the reformed fuel is first mixed by the mixer with the water vapor aenerated by the water vapor generating means.

22. The gas engine according to claim 21, wherein the hydrogen separating means and the fuel reforming device are integrally configured, and wherein, while hydrogen is separated and extracted by the hydrogen separating means, a fuel reforming operation is performed by the fuel reforming device.

23. The gas engine according to any of the claims 21, 22, or 5, comprising:

a desulfurizing device that removes sulfur content contained in a fuel by hyd rogenation-desulfurization;

wherein a portion of the hydrogen separated and extracted by the hydrogen separating means is supplied to the desulfurizing device.

24. A gas engine that uses a fuel containing hydrogen components, comprising:

a transformer that uses engine exhaust heat as a heat source; and a hydrogen separating means for separating and extracting hydrogen from a fuel, wherein a transformational reaction ($H_2+CO_2 \rightarrow CO+H_2O$) between hydrogen and carbon dioxide is caused to occur in the transformer, changing a composition of the fuel, and the fuel with a changed composition is supplied to a combustion chamber, wherein the engine exhaust system comprises a $CO_2$ separating means, wherein the carbon dioxide separated from the exhaust gas by the $CO_2$ separating means is supplied to the transformer, wherein the hydrogen separated by the hydrogen separating means is supplied to the transformer and wherein the following operations are performed together:

a supply operation in which carbon dioxide separated by the $CO_2$ separating means of the gas engine is supplied to the transformer; and a supply operation in which hydrogen separated by a hydrogen separating means of the gas engine is supplied to the transformer.

25. A gas engine that uses a fuel containing hydrogen components, comprising:

a transformer that uses engine exhaust heat as a heat source; and a hydrogen separating means for separating and extracting hydrogen from the fuel, wherein a transformational reaction ($H_2+CO_2 \rightarrow CO+H_2O$) between hydrogen and carbon dioxide is caused to occur in the transformer, changing a composition of the fuel, and the fuel with a changed composition is supplied to a combustion chamber, wherein a fuel from which hydrogen has been separated and extracted by the hydrogen separating means is supplied to a combustion chamber and wherein at least two of the following operations are performed:

a supply operation in which a fuel that has a changed composition due to a transformational reaction using the transformer of the gas engine is supplied to a combustion chamber;

a supply operation in which water vapor that is produced by a water vapor producing means that uses engine exhaust heat as a heat source to produce water vapor is supplied to a fuel supply system; and a supply operation in which a fuel from which hydrogen has been separated and extracted by the hydrogen separating means in the gas engine is supplied to a combustion chamber.

26. The gas engine according to claim 25, wherein, in the supply operation in which water vapor is supplied to a fuel supply system of the gas engine;

the fuel is a hydrocarbon-based fuel;

wherein the gas engine comprises a fuel reforming device that reforms fuel by using engine exhaust heat to cause an endothermic reaction ($C_mH_n+mH_2O \rightarrow mCO+(n/2+m)H_2$) between water vapor and the fuel; and wherein a fuel reformed by the fuel reforming device is supplied to a combustion chamber.

27. A gas engine that uses a fuel containing hydrogen components, comprising:

a transformer that uses engine exhaust heat as a heat source;

wherein a transformational reaction ($H_2+CO_2 \rightarrow CO+H_2O$) between hydrogen and carbon dioxide is caused to occur in the transformer, changing a composition of the fuel, and the fuel with a changed composition is supplied to a combustion chamber, wherein the fuel is a hydrocarbon-based fuel;

wherein the gas engine comprises a fuel reforming device that reforms fuel by using engine exhaust heat to cause an endothermic reaction ($C_mH_n+mH_2O \rightarrow mCO+(n/2+m)H_2$) between water vapor and the fuel;

wherein a fuel reformed by the fuel reforming device is supplied to a combustion chamber; and wherein at least two of the following operations are performed:

a temperature-raising operation in which the temperature inside the transformer is raised by combusting a portion of pre-transformation fuel or post-transformation fuel in the gas engine;

a temperature-raising operation in which the temperature inside the transformer is raised by combusting a portion of pre-reforming fuel or post-reforming fuel in the gas engine;

a temperature-raising operation in which the temperature inside the fuel reforming device is raised by combusting a portion of pre-reforming fuel or post-reforming fuel in the gas engine;

a temperature-raising operation in which the temperature inside the fuel reforming device is raised by combusting a portion of pre-transformation fuel or post-transformation fuel in the gas engine;

a temperature-raising operation in which the temperature inside the transformer is raised by the combustion of non-combusted components by an oxidation catalyst device in the gas engine with the oxidation catalyst device causing non-combusted components in exhaust gas to be combusted, wherein the temperature inside the transformer is raised above the temperature of the exhaust by the combustion of non-combusted components with the oxidation catalyst device;

a temperature-raising operation in which the temperature inside the fuel reforming device is raised by the combustion of non-combusted components by the oxidation catalyst device in the gas engine, the oxidation catalyst device causing non-combusted components in exhaust gas to be combusted, wherein the temperature inside the fuel reforming device is raised above the temperature of the exhaust by the combustion of non-combusted components with the oxidation catalyst device;

a temperature-raising operation in which the temperature inside the transformer is raised by the heat generated by hydride formation when the hydrogen absorbing material absorbs hydrogen in the gas engine that includes a hydrogen absorbing device that contains the hydrogen absorbing material and is capable of absorbing hydrogen, wherein the temperature inside the transformer is raised above the temperature of the exhaust by the heat generated by hydride formation when the hydrogen absorbing material absorbs hydrogen;

a temperature-raising operation in which the temperature inside the fuel reforming device is raised by the heat generated by hydride formation when the hydrogen absorbing material absorbs hydrogen in hydrogen absorbing device of the gas engine, wherein the temperature inside the fuel reforming device is raised above the temperature of the exhaust by the heat generated by hydride formation when the hydrogen absorbing material absorbs hydrogen, or;

a pressure-reducing operation in which the pressure inside the fuel reforming device is reduced in the gas engine when the pressure inside the fuel reforming device can be reduced when a hydrocarbon-based fuel is reformed.

28. The gas engine according to claim 27, comprising:

a mixer that mixes hydrogen and post-transformation fuel; and an adjustment means capable of freely adjusting the mixing proportions in the mixer of hydrogen and post-transformation fuel.

29. The gas engine according to claim 27, comprising:

a mixer that mixes hydrogen and hydrogen-separated reformed fuel; and an adjustment means capable of freely adjusting the mixing proportions in the mixer of hydrogen and hydrogen-separated reformed fuel.

* * * * *